United States Patent
Pajak et al.

(10) Patent No.: US 11,384,805 B2
(45) Date of Patent: Jul. 12, 2022

(54) BRAKE DISC ASSEMBLY

(71) Applicant: Honeywell International Inc., Morris Plains, NJ (US)

(72) Inventors: William E Pajak, Chesterton, IN (US); Ryan Bourlier, Elkhart, IN (US); Jonathan T. Beehler, Bremen, IN (US)

(73) Assignee: Honeywell International Inc., Charlotte, NC (US)

( * ) Notice: Subject to any disclaimer, the term of this patent is extended or adjusted under 35 U.S.C. 154(b) by 200 days.

(21) Appl. No.: 16/691,253

(22) Filed: Nov. 21, 2019

(65) Prior Publication Data
US 2021/0156440 A1  May 27, 2021

(51) Int. Cl.
| F16D 65/12 | (2006.01) |
| B64C 25/42 | (2006.01) |
| F16D 69/02 | (2006.01) |
| F16D 65/02 | (2006.01) |

(52) U.S. Cl.
CPC ........... *F16D 65/125* (2013.01); *B64C 25/42* (2013.01); *F16D 69/023* (2013.01); *F16D 2065/132* (2013.01); *F16D 2065/1324* (2013.01); *F16D 2200/003* (2013.01); *F16D 2200/0021* (2013.01); *F16D 2200/0047* (2013.01); *F16D 2200/0052* (2013.01); *F16D 2250/0061* (2013.01)

(58) Field of Classification Search
CPC ........... F16D 65/125; F16D 2065/132; F16D 2200/0052; F16D 2200/0021; F16D 69/023; F16D 2065/1324; F16D 2200/003; F16D 2200/0047; F16D 2250/006; B64C 25/42
See application file for complete search history.

(56) References Cited

U.S. PATENT DOCUMENTS

| 3,018,852 A | 1/1962 | Stanton |
| 3,473,637 A | 10/1969 | Rutt |
| 3,552,533 A | 1/1971 | Nitz et al. |
| 3,724,613 A | 4/1973 | Bermingham |
| 3,759,354 A | 9/1973 | Dowell et al. |
| 3,857,469 A | 12/1974 | Stimson |

(Continued)

FOREIGN PATENT DOCUMENTS

| CN | 106917836 A | 7/2017 |
| EP | 3428470 A1 | 1/2019 |

(Continued)

OTHER PUBLICATIONS

Notice of Allowance from U.S. Appl. No. 16/502,446, dated May 26, 2021, 8 pp.

(Continued)

*Primary Examiner* — Pamela Rodriguez
(74) *Attorney, Agent, or Firm* — Shumaker & Sieffert, P.A.

(57) ABSTRACT

In some examples, a brake disc assembly including a single continuous core portion defining a core of the brake disc assembly; and a friction portion adjacent the core portion. The friction portion defines the friction surface of the brake disc assembly during a braking operation. The friction portion includes a carbon composite material. The core portion includes a core material that is not a carbon composite material, and the core portion is configured as a heat sink for the brake disc assembly for heat generated during the braking operation.

20 Claims, 14 Drawing Sheets

(56) References Cited

U.S. PATENT DOCUMENTS

| | | |
|---|---|---|
| 3,920,108 A | 11/1975 | Ely |
| 4,102,438 A | 7/1978 | Rancourt |
| 4,613,021 A | 9/1986 | Lacombe et al. |
| 4,742,948 A | 5/1988 | Fisher et al. |
| 5,558,186 A | 9/1996 | Hyde et al. |
| 5,769,185 A | 6/1998 | Main et al. |
| 5,779,006 A | 7/1998 | Hyde et al. |
| 6,205,633 B1 | 3/2001 | Niespodziany et al. |
| 6,702,068 B1 | 3/2004 | Riebe |
| 7,858,187 B2 | 12/2010 | Simpson et al. |
| 8,383,197 B2 | 2/2013 | La Forest et al. |
| 8,657,080 B2 | 2/2014 | Constans |
| 8,746,427 B2 | 6/2014 | Foege et al. |
| 8,789,665 B2 | 7/2014 | Gilboy et al. |
| 9,366,302 B1 | 6/2016 | Kirkpatrick |
| 9,689,450 B2 | 6/2017 | Arbesman et al. |
| 9,695,891 B2 | 7/2017 | Kirkpatrick |
| 10,094,439 B2 | 10/2018 | Charles et al. |
| 2006/0046059 A1 | 3/2006 | Arico et al. |
| 2013/0075207 A1* | 3/2013 | Bruntz .................. B23P 15/00 188/218 XL |
| 2017/0114847 A1 | 4/2017 | Ferrari et al. |
| 2018/0252284 A1 | 9/2018 | Charles et al. |
| 2019/0359233 A1 | 11/2019 | Kato et al. |

FOREIGN PATENT DOCUMENTS

| | | |
|---|---|---|
| EP | 3489538 A1 | 5/2019 |
| EP | 3760890 A1 | 1/2021 |
| EP | 3859186 A1 * | 8/2021 |
| FR | 1340798 A | 10/1963 |
| FR | 2326623 A1 | 4/1977 |
| GB | 1197669 A | 7/1970 |
| GB | 1349444 | 4/1974 |
| WO | 2004/029473 A1 | 4/2004 |
| WO | 2005/116476 A2 | 12/2005 |

OTHER PUBLICATIONS

Office Action from U.S. Appl. No. 16/502,446, dated Feb. 4, 2021, 10 pp.
Extended Search Report from counterpart European Application No. 20207049.6, dated Apr. 26, 2021, 6 pp.
Response to Extended Search Report dated Apr. 26, 2021, from counterpart European Application No. 20207049.6, filed Apr. 27, 2021, 48 pp.
Response to Office Action dated Feb. 4, 2021, from U.S. Appl. No. 16/502,446, filed Apr. 30, 2021, 14 pp.
U.S. Appl. No. 16/502,446, filed Jul. 3, 2019, naming inventors Bourlier et al.
Notice of Intent to Grant and Text Intended to Grant from counterpart European Application No. 20207049.6, dated Oct. 22, 2021, 53 pp.

* cited by examiner

|  | Carbon | Steel (A709 Gr50) | Ti-6Al-4V | Ti-6Al-6V-2Sn | Ti-0.8Ni-0.3Mo | Tungsten-Carbide |
|---|---|---|---|---|---|---|
| Specific heat (J/(kg-K)) | 707 (graphite) | 475 | 526 | 650 | 540 | 238 |
| Thermal Conductivity (W/(m-K)) | 23 | 46.6 | 6.7 | 7.2 | 22.7 | 58 |
| Density (g/cm^3) | 1.8 | 7.85 | 4.43 | 4.54 | 4.51 | 15.57 |
| Melting Point (C) | >2000 | 1510 | 1660 | 1704 | 1660 | 2823 |
| Shear Strength (Mpa) | 45.5 (S2R Zoltek) | 320 | 760 |  |  |  |
| Cp*ρ | 1272 | 3728 | 2330 | 2951 | 2435 | 3706 |

FIG. 6

BRAKE DISC ASSEMBLY

TECHNICAL FIELD

The disclosure relates to braking systems, such as aircraft braking systems.

BACKGROUND

An aircraft braking system may be used for various purposes, such as for slowing or stopping the aircraft while maneuvering on the ground. For example, when a jet-powered aircraft lands, the aircraft braking system, various aerodynamic drag sources (e.g., flaps, spoilers, and the like) and aircraft thrust reversers may be used to slow the aircraft down in the desired runway distance. Once the aircraft is sufficiently slowed and taxiing from the runway toward its ground destination, the aircraft braking system may be used to slow the aircraft and bring it to a stop at its final ground destination.

SUMMARY

The disclosure describes, in some examples, brake disc assemblies that include a single continuous core portion and one or more friction portions. The core portion may define a core of the brake disc assembly and the friction portion(s) may define the friction surface(s) of the brake disc assembly when used in a braking operation. The friction portions may be formed of a carbon composite material while the core portion may be formed of a core material other than that of a carbon composite material. For example, the core material may be a material with a relatively high volumetric specific heat capacity, e.g., as compared to the carbon composite material employed for the friction portion(s) of the assembly. The core portion may be configured to act as a heat sink for the brake disc assembly for heat generated during the braking operation.

In one example, a brake disc assembly comprising a single continuous core portion defining a core of the brake disc assembly; and a friction portion adjacent the core portion, the friction portion defining a friction surface of the brake disc assembly during a braking operation, wherein the friction portion comprises a carbon-carbon composite material, wherein the core portion comprises a core material that is not a carbon-carbon composite material, and wherein the core portion is configured as a heat sink for the brake disc assembly for heat generated during the braking operation.

In another example, a method for forming a brake disc assembly, the method comprising: positioning a single continuous core portion adjacent to a friction portion; and attaching the core portion to the friction portion, wherein the core portion defines a core of the brake disc assembly, wherein the friction portion defines a friction surface of the brake disc assembly during a braking operation, wherein the friction portion comprises a carbon-carbon composite material, wherein the core portion comprises a core material that is not a carbon-carbon composite material, and wherein the core portion is configured as a heat sink for the brake disc assembly for heat generated during the braking operation.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 6 is a table listing various properties of example materials.

DETAILED DESCRIPTION

Figure 1:
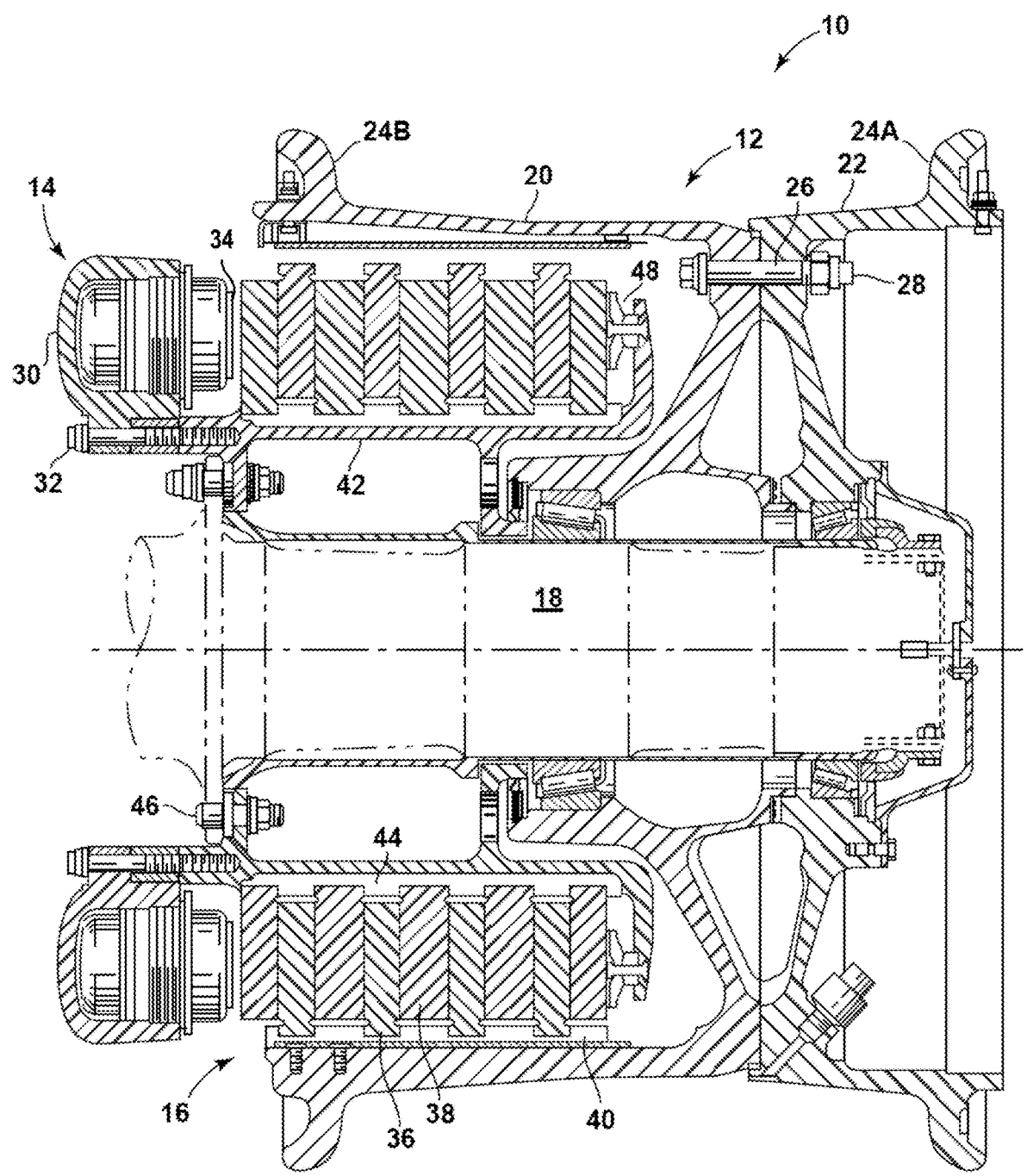
FIG. 1 is a conceptual diagram illustrating an example wheel and brake assembly that may include brake disc assemblies formed in accordance with the techniques of this disclosure.

The disclosure describes, in some examples, brake disc assemblies that include a single continuous core portion and one or more friction portions, e.g., friction pad(s). The friction portion(s) may be formed of a carbon-carbon composite material while the core portion may be formed of a material other than that of a carbon-carbon composite material, such as another other type of ceramic material or metallic material. The carbon-carbon composite friction portion may be carbon fibers in a carbon matrix.

In example aircraft braking systems, one or more rotatable brake discs ("rotors") may be mechanically connected to one or more wheels of the vehicle and one or more stationary brake discs ("stators") may be mechanically connected to the body of the aircraft. The rotatable and stationary brake discs may be alternately splined to a torque tube or wheel rim of an aircraft wheel to define a brake disc stack. To produce a desired braking force, a brake actuator may engage the rotatable and stationary brake discs with each other. The friction between the brake discs converts the kinetic energy of the moving aircraft to thermal energy, causing the aircraft to slow down or stop.

In some examples, such braking systems may use brake discs formed entirely of steel. In other examples, carbon-carbon composite brake discs (e.g., where the brake discs are made entirely of carbon composite) may be used in place of steel brake discs, e.g., in an effort to reduce the weight of the brake discs compared to steel brake discs. However, the replacement of steel brake disc with carbon-carbon composite brake discs may present one or more problems, e.g., in braking systems designed for steel brake discs. For example, the volume available inside a brake assembly that is allotted to the friction material of the disc may be fixed, which may reduce the useable life span of a carbon composite disc before the disc needs to be replaced. Additionally, the use of an entirely carbon-carbon composite material within the allotted volume may present issues with the ability of the brake pad to function as a heat sink, e.g., during braking operation, while also functioning as a friction material with a desirable useable life span.

In accordance with some examples of the disclosure, a brake disc may include a single continuous core portion and a friction portion adjacent to the core portion. The friction portion, e.g., in the form of one or more friction pads, may define the friction surface(s) of the brake disc during operation in a braking system. The core portion may be adjacent to the friction portion to define a heat sink for the brake disc assembly during the braking operation. The friction portion(s) may be formed of a carbon-carbon composite material, while the core portion may be formed of a material other than a carbon-carbon composite material.

In this manner, the carbon-carbon composite material may define the friction surfaces of the brake disc while the single continuous core portion is defined by a material that has a higher volumetric heat capacity (which is equal to the specific heat multiplied by the density (specific heat*density)) than the carbon-carbon composite material, such as steel or other materials described herein. Such a combination may allow for a brake disc assembly that has more thermal capacity within a smaller volume, e.g., as compared to a brake disc formed entirely of a carbon-carbon composite material. As a result, more volume within the overall allotted volume of a braking assembly may be allotted to wear material, which increases the wear life of a brake disc, while still providing a desired heat capacity within the overall volume of the brake disc. Put another way, for a given overall disc volume, the volume of friction material may be relatively high since the core portion may have a smaller volume as a result of the higher specific heat*density of the core portion, while providing an adequate heat sink for the brake disc.

For ease of description, "specific heat*density" will be used interchangeably with volumetric heat capacity in this disclosure.

In some examples, such a hybrid brake disc including carbon-carbon composite material friction portion(s) and a single continuous core portion defined by a non-carbon-carbon composite material may provide one or more benefits. For example, in the context of replacing steel brake discs in an existing braking system, wear life may be increased compared to all steel or all carbon-carbon composite brake discs within the volume allotted for the brake disc within the braking system. In some examples, the use of the hybrid brake disc may increase the landing per overhaul (LPO) of the brake disc by two times compared to a carbon-carbon composite brake disc while still reducing weight compared to a steel brake disc.

FIG. 1 is a conceptual diagram illustrating an example wheel and brake assembly 10 that may include one or more of "hybrid" brake disc, according to examples of the disclosure. For ease of description, examples of the disclosure will be described primarily with regard to aircraft brake assemblies. However, the articles of this disclosure may be used to form brake components other than aircraft brake discs. For example, the brake components may be used as friction materials in other types of braking applications and vehicles.

In the example of FIG. 1, wheel and brake assembly 10 includes a wheel 12, an actuator assembly 14, a brake stack 16, and an axle 18. Wheel 12 includes wheel hub 20, wheel outrigger flange 22, bead seats 24A and 24B, lug bolt 26, and lug nut 28. Actuator assembly 14 includes actuator housing 30, actuator housing bolt 32, and ram 34. Brake stack 16 includes alternating rotor brake discs 36 and stator brake discs 38; rotor brake discs 36 are configured to move relative to stator brake discs 38. Rotor brake discs 36 are keyed to wheel 12, and in particular wheel hub 20, by beam keys 40. Stator brake discs 38 are mounted to axle 18, and in particular torque tube 42, by splines 44. Wheel and brake assembly 10 may support any variety of private, commercial, or military aircraft or other type of vehicle.

Wheel and brake assembly 10 includes wheel 12, which in the example of FIG. 1 is defined by a wheel hub 20 and a wheel outrigger flange 22. Wheel outrigger flange 22 may be mechanically affixed to wheel hub 20 by lug bolts 26 and lug nuts 28. Wheel 12 defines bead seats 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seats 24A and 24B providing a hermetic seal for the inflatable tire.

Wheel and brake assembly 10 may be mounted to a vehicle via torque tube 42 and axle 18. In the example of FIG. 1, torque tube 42 is affixed to axle 18 by a plurality of bolts 46. Torque tube 42 supports actuator assembly 14 and stator brake discs 38. Axle 18 may be mounted on a strut of a landing gear (not shown) or other suitable component of the vehicle to connect wheel and brake assembly 10 to the vehicle.

During operation of the vehicle, braking may be necessary from time to time, such as during landing and taxiing procedures of an aircraft. Wheel and brake assembly 10 is configured to provide a braking function to the vehicle via actuator assembly 14 and brake stack 16. Actuator assembly 14 includes actuator housing 30 and ram 34. Actuator assembly 14 may include different types of actuators such as one or more of, e.g., an electrical-mechanical actuator, a hydraulic actuator, a pneumatic actuator, or the like. During operation, ram 34 may extend away from actuator housing 30 to axially compress brake stack 16 against compression point 48 for braking.

Brake stack 16 includes alternating rotor brake discs 36 and stator brake discs 38. Rotor brake discs 36 are keyed to wheel hub 20 for common rotation by beam keys 40. Stator brake discs 38 are keyed to torque tube 42 by splines 44. In the example of FIG. 1, brake stack 16 includes four rotors and five stators. However, a different number of rotors and/or stators may be included in brake stack 16 in other examples.

In some examples, rotor brake discs 36 and stator brake discs 38 may be mounted in wheel and brake assembly 10 by beam keys 40 and splines 44, respectively. In some examples, beam keys 40 may be circumferentially spaced about an inner portion of wheel hub 20. Beam keys 40 may, for example, be shaped with opposing ends (e.g., opposite sides of a rectangular) and may have one end mechanically affixed to an inner portion of wheel hub 20 and an opposite end mechanically affixed to an outer portion of wheel hub 20. Beam keys 40 may be integrally formed with wheel hub 20 or may be separate from and mechanically affixed to wheel hub 20, e.g., to provide a thermal barrier between rotor brake discs 36 and wheel hub 20. Toward that end, in different examples, wheel and brake assembly 10 may include a heat shield (not shown) that extends out radially and outwardly surrounds brake stack 16, e.g., to limit thermal transfer between brake stack 16 and wheel 12.

In some examples, splines 44 may be circumferentially spaced about an outer portion of torque tube 42. As such, stator brake discs 38 may include a plurality of radially inwardly disposed lug notches along an inner diameter of the brake disc configured to engage with splines 44. Similarly, rotor brake discs 36 may include a plurality of radially inwardly disposed lug notches along an outer diameter of the brake disc configured to engage with beam keys 40. As such rotor brake discs 36 will rotate with the motion of the wheel while stator brake discs 38 remain stationary allowing the friction surfaces of an adjacent stator brake disc 38 and rotor brake disc 36 to engage with one another to deaccelerate the rotation of wheel 12.

Rotor brake discs 36 and stator brake discs 38 may provide opposing friction surfaces for braking an aircraft. As kinetic energy of a moving aircraft is transferred into thermal energy in brake stack 16, temperatures may rapidly increase in brake stack 16. As such, rotor brake discs 36 and stator brake discs 38 that form brake stack 16 may include robust, thermally stable materials capable of operating at very high temperatures and quickly dissipating heat. As torque is applied to brake stack 16, stresses may increase in brake stack 16. As such, rotor brake discs 36 and stator brake discs 38 that form brake stack 16 may include strong, corrosion resistant materials capable of operating at high stresses. However, these thermal and structural properties may not be available in a single material. For example, materials with high thermal stability may not transfer heat efficiently or provide high strength.

In some examples, at least one rotor brake disc of rotor brake discs 36 and/or at least one stator brake disc of stator brake discs 38 are formed from a single continuous core portion and one or more friction pads on one or more sides of the core portion. The friction pad(s) may define the friction portions of each of brake discs 36, 38. As described herein, the one or more friction pads may be formed of a carbon-carbon composite material while the single continuous core portion may be defined by a material other than that of a carbon-carbon composite material, e.g., where the material has a higher specific heat*density than the carbon-carbon composite material defining the one or more friction pads.

Figure 2A:
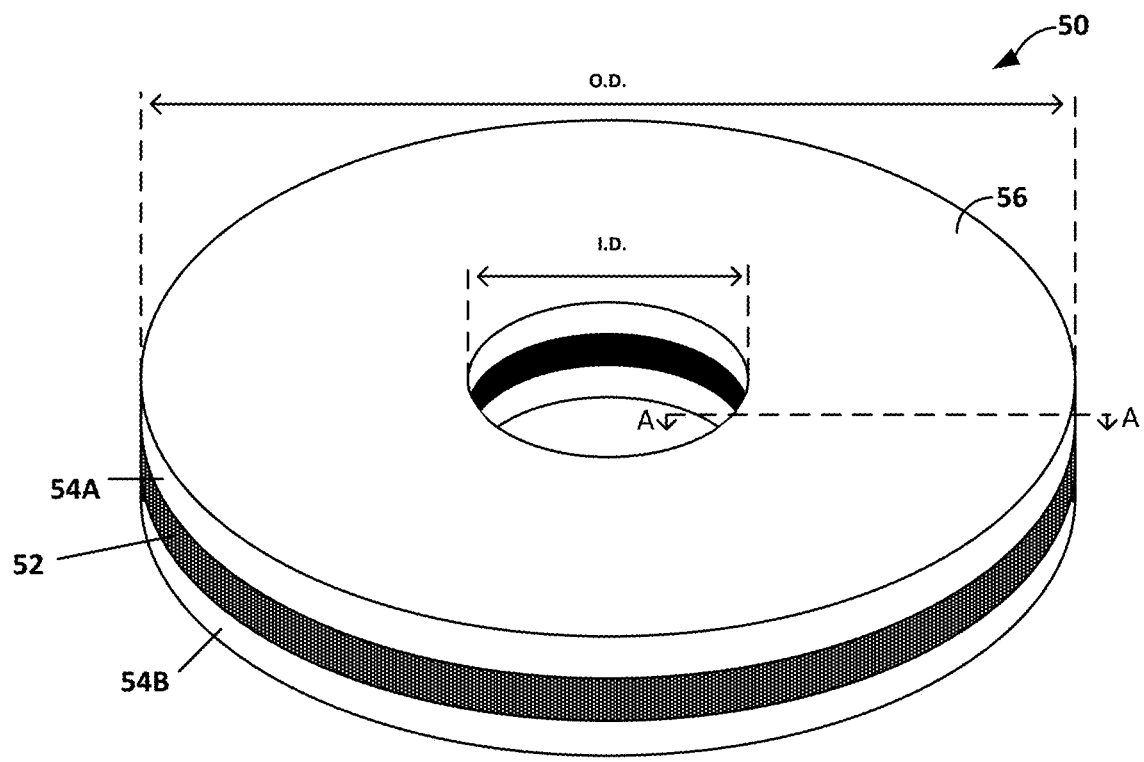
FIGS. 2A and 2B are conceptual schematic diagrams illustrating an example brake disc assembly, according to examples of the disclosure.
Figure 2B:
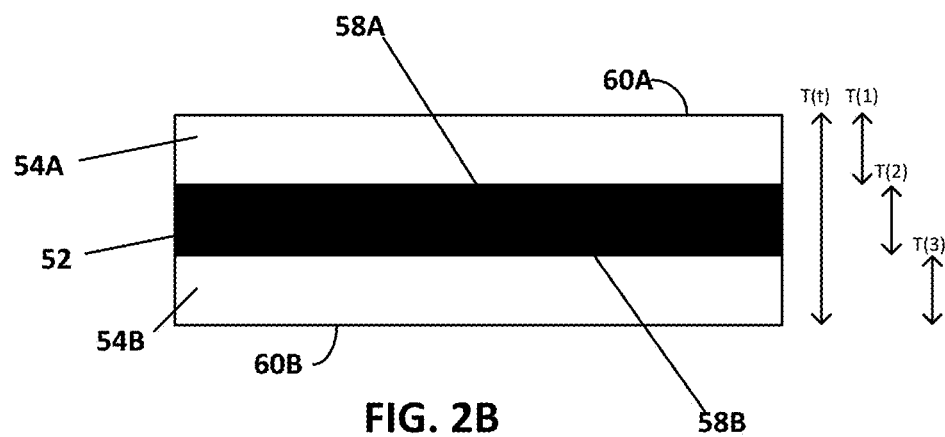

FIG. 2A is a conceptual schematic diagram of an example brake disc assembly 50 in accordance with examples of the disclosure. FIG. 2B is a conceptual diagram illustrating a view of brake disc assembly 50 along cross-section A-A shown in FIG. 2A. Brake disc assembly 50 includes a core portion 52 and a plurality of friction pads on one or more sides of core portion 52. In the example of FIGS. 2A and 2B, the plurality of friction pads includes a first friction pad 54A and a second friction pad 54B (referred to singularly and collectively as "friction pad 54" and "friction pads 54").

Brake disc assembly 50 may be used for any one or more of rotor brake discs 36 and/or stator brake discs 38 of FIG. 1. As used herein a "brake disc" and "brake disc assembly" may be used interchangeably to describe either a rotor disc or a stator disc. Likewise, the terms "friction pad" and "core portion" are used to describe a friction pad and single continuous core portion, e.g., that defines a heat sink for the brake disc during operation, for either a rotor or stator disc and are not necessarily intended to impart a geometric configuration specific to one or the other.

Core portion 52 may be a disc or annulus having a first core surface 58A and a second core surface 58B (referred to singularly and collectively as "core surface 58" and "core surfaces 58") that are oppositely oriented from each other and configured to receive and interface with corresponding friction pads 54A and 54B. Correspondingly, each friction pad 54 may be a disc or annulus having a corresponding pad surface at the interface with core surfaces 58 and a corresponding friction surface 60A and 60B (referred to singularly and collectively as "friction surface 60" and "friction surfaces 60") that are oppositely oriented from each other. Each pad surface 60 of friction pad 54 is configured to be received by core portion 52 and interface with a core surface 58 on a same side of core portion 52 and a support structure, such as another friction pad 54, on an opposite side of core portion 52. The exposed friction surfaces 60 of friction pads 54 frictionally engage an opposing brake disc during a braking operation.

In another example, a plurality of friction pads made up of multiple radial sections that together make up the disc or annulus, rather than one single component. For example, in the case of an annular ring, friction pad 54 may be formed of four sections, each being roughly 90 degrees of the entire 360 degree ring.

By forming core portion 52 and friction pads 54 as independent components, materials forming core portion 52 and friction pads 54 may be tailored to exhibit different mechanical, chemical, and/or thermal properties, such as improved friction properties for friction pads 54 and improved strength, corrosion resistance, and/or thermal properties for core portion 52. For example, core portion 52 may be formed of a material having desirable thermal properties to function as a heat sink in a relatively small volume while friction pads 54 may be formed of a carbon-carbon composite material that has desirable friction properties.

In some examples, core portion 52 and friction pads 54 may include various structural and surface features configured to relieve stress and/or remove heat from friction pads 54 to allow further differentiation in material properties between core portion 52 and friction pads 54. The resultant brake disc assembly 50 may exhibit both improved strength within the underlying core portion 52 and improved frictional properties associated with friction pads 54.

In accordance with some examples of the disclosure, friction pads 54 may be formed of a carbon-carbon composite material while core portion 52 may be formed of a different material, e.g., a metallic or ceramic material other than that of a carbon-carbon composite material. The carbon-carbon composite material of friction pads 54 may exhibit desirable friction properties while core portion 52 may be formed of a material that has properties that are more desirable as a heat sink material, e.g., by having a specific heat*density greater than that of friction pads 54. Additionally, core portion 52 may be formed of a single continuous piece of material, e.g., rather than a combination of two or more pieces of the same or different materials between friction pads 54. This may allow core portion 52 to better function as a heat sink for brake disc 50, e.g., because of better heat transfer properties within core portion 52.

The carbon-carbon composite material that forms friction pads 54 may include carbon fibers in a carbon matrix (e.g., graphite). In some examples, friction pads 54 may be formed from a carbon-carbon composite fabricated from a densified carbon material. In some examples, the carbon material may include a plurality of carbon fibers and densifying material. The carbon fibers may be composed of carbon or carbon precursor materials such as polyacrylonitrile (PAN) or rayon, which may be converted into carbon thorough a carbonization process. The carbon fibers used to form friction pads 54 may be arranged in a woven or non-woven as either a single layer or multilayer structure. In some examples in with both friction pad 54A and friction pad 54B may include the same underlying carbon architecture (e.g., both woven) or may include different carbon fiber architectures (e.g., woven and non-woven friction pads) depending on the desired mechanical or friction properties. In some examples, carbon-carbon composite materials may include woven carbon fibers and a matrix material (e.g., carbonized pitch or resin). In some examples, the carbon matrix may be pyrolytic graphite. In some examples, the carbon fibers may be pyrolytic carbon fibers. Other matrix and fibers are contemplated for the carbon-carbon composite material of friction pads 54.

The carbon-carbon composite material of friction pads 54 may be fabricated using any suitable technique. As one example, friction pads 54 may be formed by densifying a carbon fiber preform including layers of fabric sheets formed of woven or nonwoven carbon fiber. Densification of the carbon fiber preform may include infiltrating the preform with liquid pitch using vacuum pressure infiltration (VPI) and/or resin transfer molding (RTM) followed by carbonization of the pitch to achieve a carbon-carbon composite material exhibiting a desired final density. Additionally, or alternatively, chemical vapor infiltration (CVI) or chemical vapor deposition (CVD) may be used to densify the fabric preform. In some examples, densified carbon-carbon composite material of pads 54 exhibits a density greater than or equal to approximately 1.7 grams per cubic centimeter (g/cc), such as, e.g., between approximately 1.75 g/cc and approximately 1.90 g/cc.

In some examples of CVD/CVI, the carbonized preform is heated in a retort under the cover of inert gas, such as at a pressure below 100 torr. When the carbonized preform reaches a temperature between about 900 degrees Celsius and about 1200 degrees Celsius, the inert gas is replaced with a carbon-bearing gas such as natural gas, methane, ethane, propane, butane, propylene, or acetylene, or a combination of at least two of these gases. When the carbon-bearing gas flows around and through the carbonized preform, a complex set of dehydrogenation, condensation, and polymerization reactions occur, thereby depositing the carbon atoms within the interior and onto the surface of the carbonized preform. Over time, as more and more of the carbon atoms are deposited onto the surfaces of pores in the carbonized preform, the carbonized preform becomes denser. This process may be referred to as densification, because the open spaces in the carbonized preform are eventually filled with a carbon matrix until generally solid carbon parts are formed. U.S. Patent Application Publication No. 2006/0046059 (Arico et al.), the entire disclosure of which is incorporated herein by reference, provides an overview of example CVD/CVI processing that can be used with the techniques described herein.

Core portion 52 may function as a heat sink for brake disc assembly 50 during the braking operation. For example, heat generated as a result of frictional interaction between to adjacent friction pads 54 during braking may be conducted from friction pads 54 into core portion 52. As described above, rather than being formed of multiple discrete components, core portion 52 constitutes a single continuous component. As such, heat may be more easily conducted throughout the entirety of core portion 52.

To allow core portion 52 to function as a heat sink, first and second core surfaces 58 of core portion 52 may include a high percentage (e.g., greater than 50% such as about 95% or greater) of surface area configured to thermally contact friction pads 54. The adjacent surfaces of friction pads 54 may thermally contact core surfaces 58 by being close enough in proximity so that friction pads 54 transfer heat to first and second core surfaces 58, such as through direct contact or contact through an intermediate layer. Correspondingly, the adjacent surfaces of friction pads 54 may include a high percentage of surface area configured to thermally contact core portion 52 along surfaces 58. The high percentage of surface area of core portion 52 and friction pads 54 that are in thermal contact may provide improved removal and dissipation of heat (e.g., higher heat removal rate, lower temperature, and/or more even temperature distribution) from friction pads 54 to core portion 52. This helps improve friction performance as the friction pads are less likely to become thermally saturated which leads to a reduction in friction until the heat can dissipate from the friction surface. While the cross-section of FIG. 2B shows core portion 52 as extending from the inner diameter (I.D.) to the outer diameter (O.D.) of the annular disc, in other examples, pads 54 may completely encapsulate core portion 52 or at least extend over core portion 52 at either the I.D. or O.D. of the annular disc, e.g., to increase the surface are of pads 54 in contact with core portion 52.

As described herein, core portion 52 may be formed of a different material from that of the carbon-carbon composite material of friction pads 54. For example, core portion 52 may not be formed of a carbon-carbon composite material. In some examples, core portion 52 is formed of a metallic or ceramic material. Example materials for core portion 52 may include titanium (including titanium alloys such as titanium nickel and/or titanium aluminum alloy), a steel, or ceramic matrix composites containing materials such as tungsten carbide, boron nitride, boron carbide, silicon carbide, or silicon nitride. In some examples, core portion 52 comprises, consists of, or consists essentially of at least one of a steel, tungsten carbide, boron nitride, boron carbide, or silicon carbide. In some examples, core portion 52 comprises, consists of, or consists essentially of titanium, titanium nickel alloy, or titanium aluminum alloy. Examples steel materials may include steel 17-22A(S) and/or steel 17-22A(V). In some examples, core portion comprises, consists of, or consists essentially of nickel based super alloy such as super alloy MAR-M-247. Example titanium alloys may include Ti-6A1-6V-2Sn and/or Ti-0.8Ni-0.3Mo.

The material of core portion 52 may have a specific heat*density that is greater than the carbon-carbon composite material of friction pads 54. In some examples, core portion 52 has a specific heat*density at room temperature of at least about 1.5 J/cm^3 K or greater, such as, about 2.3 J/cm^3 K to about 2.8 J/cm^3 K or about 2.9 J/cm^3 K to about 3.8 J/cm^3 K. In this manner, core portion 52 may function as a better heat sink for brake assembly compared to a brake pad assembly having the same volume as brake pad assembly 50 but that was formed entirely of the carbon-carbon composite material of friction pads 54. Likewise, brake pad assembly 50 may be lighter weight compared to a similarly sized brake pad assembly formed entirely of, e.g., steel.

The material of core portion 52 may have a relatively high thermal effusivity, e.g., a thermal effusivity that is greater than the carbon-carbon composite material of friction pads 54. In some examples, core portion 52 has a thermal effusivity at room temperature of at least about 0.54 J/s^(1/2)-cm^2-K or greater, such as, about 0.74 J/s^(1/2)-cm^2-K to about 1.32 J/s^(1/2)-cm^2-K or about 1.40 J/s^(1/2)-cm^2-K to about 1.7 J/s^(1/2)-cm^2-K. In comparison, a carbon-carbon composite material may have a thermal effusivity at room temperature of about 0.54 J/s^(1/2)–cm^2-K. In this manner, core portion 52 may function as a better heat sink for brake assembly by core portion 52 readily absorbing heat, e.g., from friction pads 54, rather than forming a "bottle neck" of heat transfer at the interface between friction pads 54 and core portion 52. In some examples, a steel material used for core portion 52 may have a thermal effusivity at room temperature of about 1.32 J/s^(1/2)–cm^2-K. In some examples, a titanium alloy material, such as, Ti-0.8Ni-0.3Mc, used for core portion 52 may have a thermal effusivity at room temperature of about 0.74 J/s^(1/2)–cm^2-K. In some examples, a tungsten carbide material used for core portion 52 may have a thermal effusivity at room temperature of about 1.47 J/s^(1/2)–cm^2-K. In some examples, a boron nitride material used for core portion 52 may have a thermal effusivity at room temperature of about 1.41 J/s^(1/2)–cm^2-K. In some examples, a silicon carbide material used for core portion 52 may have a thermal effusivity at room temperature of about 1.67 J/s^(1/2)–cm^2-K.

FIG. 6 is a table of various properties for a carbon-carbon composite material (labelled "carbon") that may be used to form friction pads 54 as well as other example materials that may be used for core portion. As shown in FIG. 6, the specific heat*density (Cp*ρ) for the steel alloy (A709Gr50), titanium alloys (Ti-6Al-6V-2Sn and Ti-0.8Ni-0.3Mo), and tungsten carbide is greater than the specific heat*density of the carbon-carbon composite material.

Figure 7:
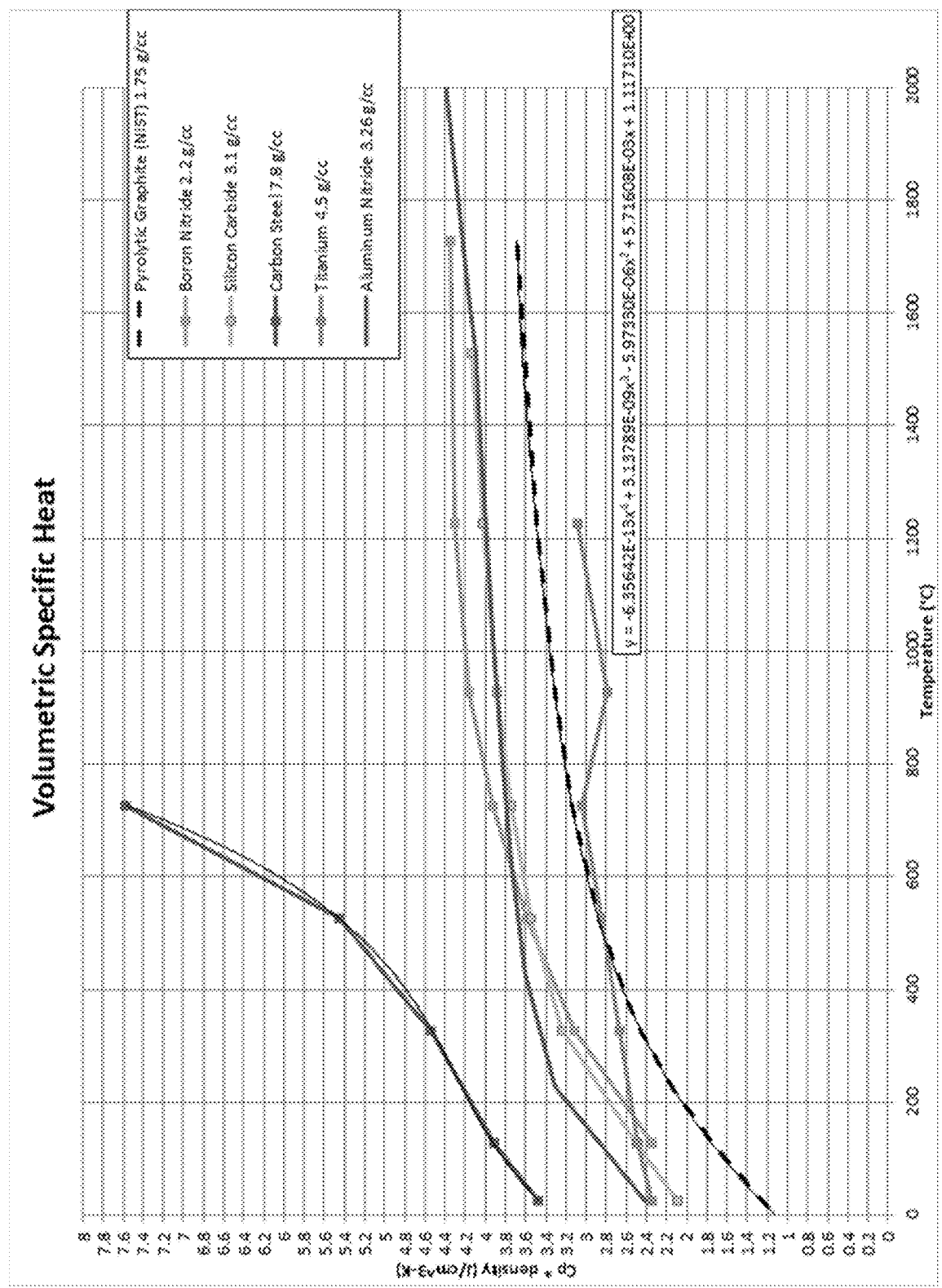
FIG. 7 is a plot of specific heat*density versus temperature for different example materials.

FIG. 7 is a plot illustrating specific heat*density versus temperature (degrees Celsius) for pyrolytic graphite, boron nitride, silicon carbide, carbon steel, and titanium. In the plot, the area under each curve represents the energy capacity per unit volume for each material. As such, the materials with more area under its respective curve can hold more energy in a smaller volumetric space.

Friction pads 54 may be coupled (e.g., permanently or removably coupled) to core portion 52 using any suitable technique. For example, friction pads 54 may be rivetted or mechanically fastened in some manner to structural core portion 52. The rivets may not be intended to take load but merely hold the pieces together while pressure is not applied to the disks. Another form of fastening may be brazing the carbon-carbon composite material of the pads to the steel or other core portion material to create a bond at localized locations. In examples in which friction pads 54 are removably coupled to core portion 52, friction pads 54 may be replaced, e.g., once friction pads 54 have been worn to some degree as a result of braking operation, while core portion 52 may be reused.

In some examples, as will be described further below, first and second core surfaces 58 of core portion 52 may include one or more structural features configured to pair and interface with one or more friction pads 54. Correspondingly, the pad surfaces of friction pads 54 that are adjacent to core surface 58 may include one or more structural features configured to pair and interface with the one or more structural features of core portion 52. The structural features of core portion 52 and friction pads 54 may provide improved load distributions, better friction pad retention, reduced costs associated with manufacturing and assembly, as well as other benefits described in further detail below.

As shown in the example of FIG. 2B, brake disc assembly 50 has a total thickness of T(t), first friction pad 54A has a thickness of T(1), core portion 52 has thickness of T(2), and second friction pad 54B has a thickness of T(3). In some examples, T(t) may be defined by the combined total of T(1), T(2), and T(3). In some examples, T(t) may be about 0.5 inches to about 2 inches in thickness. T(1) and T(3) each may be about 0.125 inches to about 1.00 inch. T(2) may be about 0.100 inches to about 0.50 inches. In some examples, T(1) may be substantially the same or different than T(3). In some examples, T(1) may be substantially the same or different than T(2).

By using a material for core portion 52 that has a higher specific heat*density than the carbon-carbon composite material of friction pads 54, the volume of core portion 52 may be reduced compared to a similar brake disc assembly formed of carbon-carbon composite material rather than an example hybrid design as described herein, while also providing desirable heat sink functionality. In some examples, the ratio of volume of core portion 52 made of a metallic or ceramic material (or example materials for core portion 52 described herein) versus one with a core portion made of a carbon-carbon composite material may be at least about 0.9, such as about 0.88 to about 0.83 or about 0.55 to about 0.5.

Figure 3A:
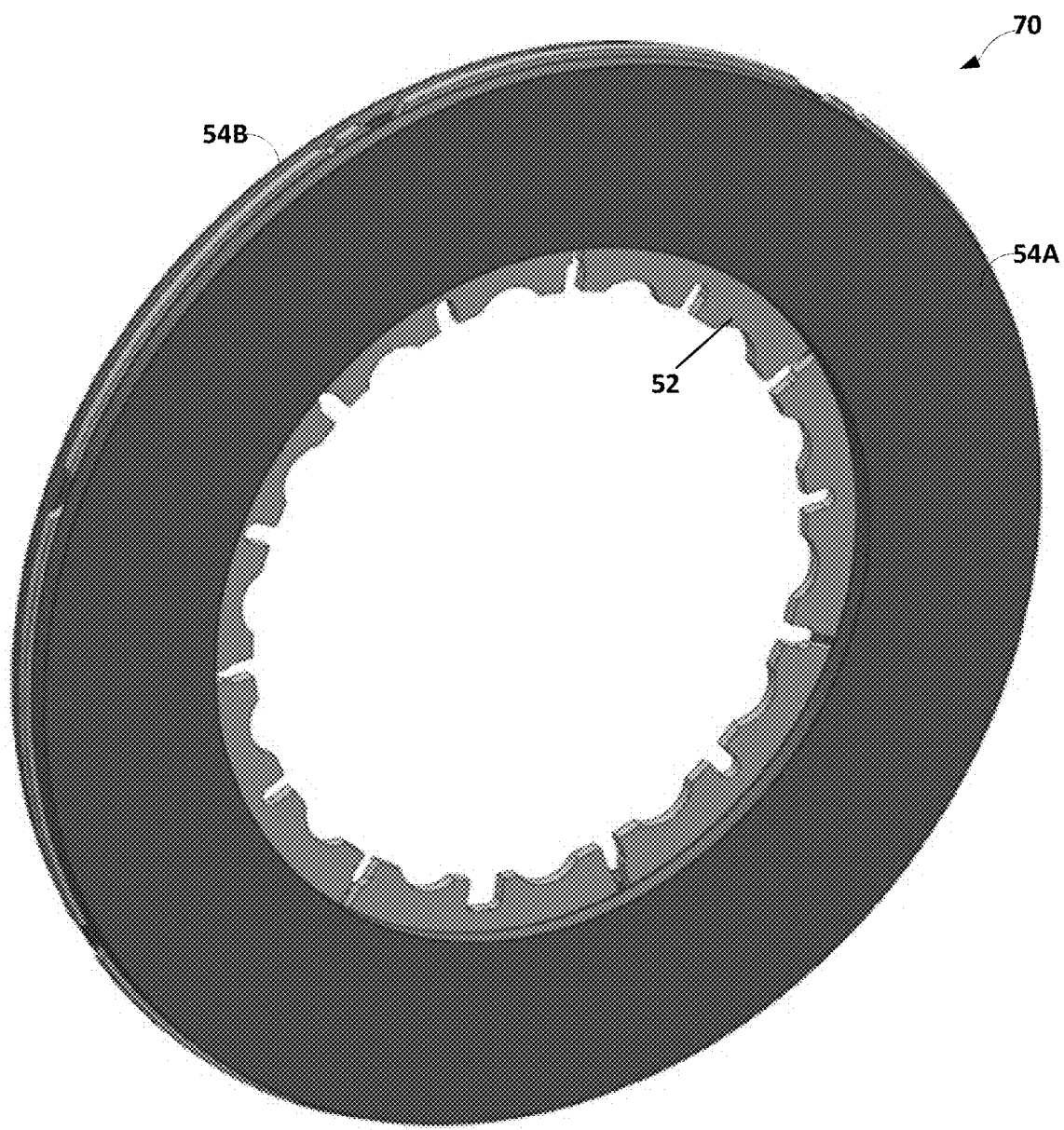
FIGS. 3A-3C are conceptual schematic diagrams illustrating another example brake disc assembly, according to examples of the disclosure.
Figure 3B:
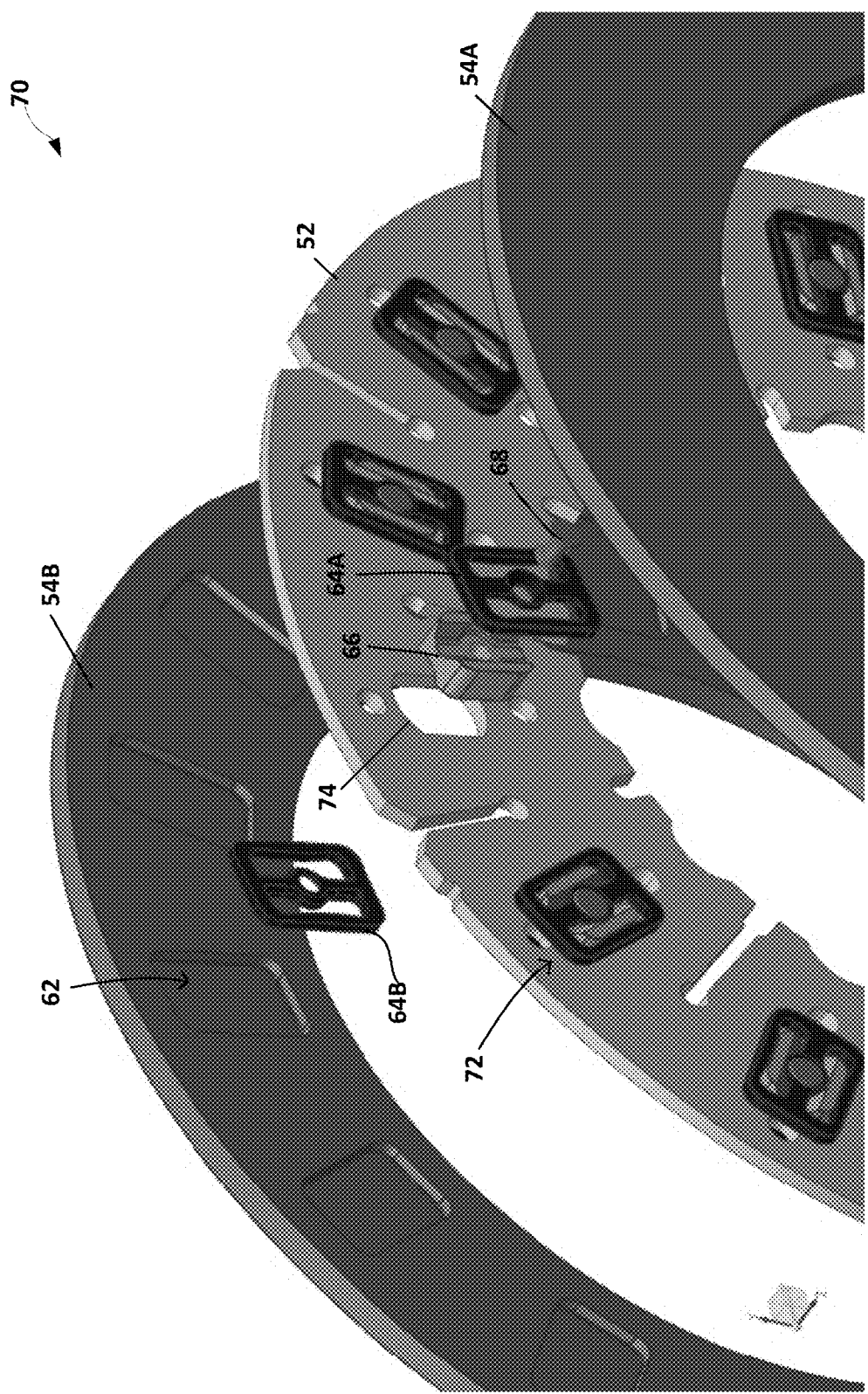
Figure 3C:

FIGS. 3A-3C are schematic diagrams illustrating an example of a brake disc assembly 70. Brake disc assembly 70 may be substantially similar to that of brake disc assembly 50, and similar features are similarly numbered. FIG. 3A illustrates an assembly view of brake disc assembly 70 including core portion 52, first friction pad 54A and second friction pad 54B. FIG. 3B illustrates a magnified and exploded view of one portion of brake disc assembly 70. FIG. 3C illustrates brake disc assembly 70 without friction pads 54.

As shown, core portion 52 is positioned between friction pads 54A and 54B, and is coupled to friction pads 54 via a plurality of boss assemblies (such as boss assembly 72 labelled in FIG. 3B). Each individual boss assembly 72 is positioned within a corresponding aperture 74 in core portion 52 such that protruding portions 64A and 64B protrude out of the surface plane of core portion 52. The protruding portions of a boss assembly mate with a corresponding grooved pocket in the opposing surface of brake pads 54. For example, as shown in FIG. 3B, boss protrusion 64B mates with grooved pocket 62 formed in the opposing surface of friction pad 54B. Similarly, boss protrusion 64A mates with a corresponding grooved pocket (not shown) in the opposing inner surface of friction pad 54A.

Boss assembly 72 also includes boss core 66 and fastener 68. To assembly boss assembly 72 within aperture 74 in core portion 52, boss protrusions 64A and 64B may be mated with boss core 66 within aperture 74 is core portion 52. Fastener 68 may be inserted through an aperture in boss protrusion 64A, boss core 66, and boss protrusion 64B to fasten boss protrusion 64A, boss core 66, and boss protrusion 64B to each other within aperture 74. When fastened, since boss protrusions 64A and 64B are larger than aperture 74, an outer portion of boss protrusions 64A and 64B overlap with the opposing surface of core portion 52 to secure boss assembly 72 to core portion 52 within aperture 74.

Figure 8:
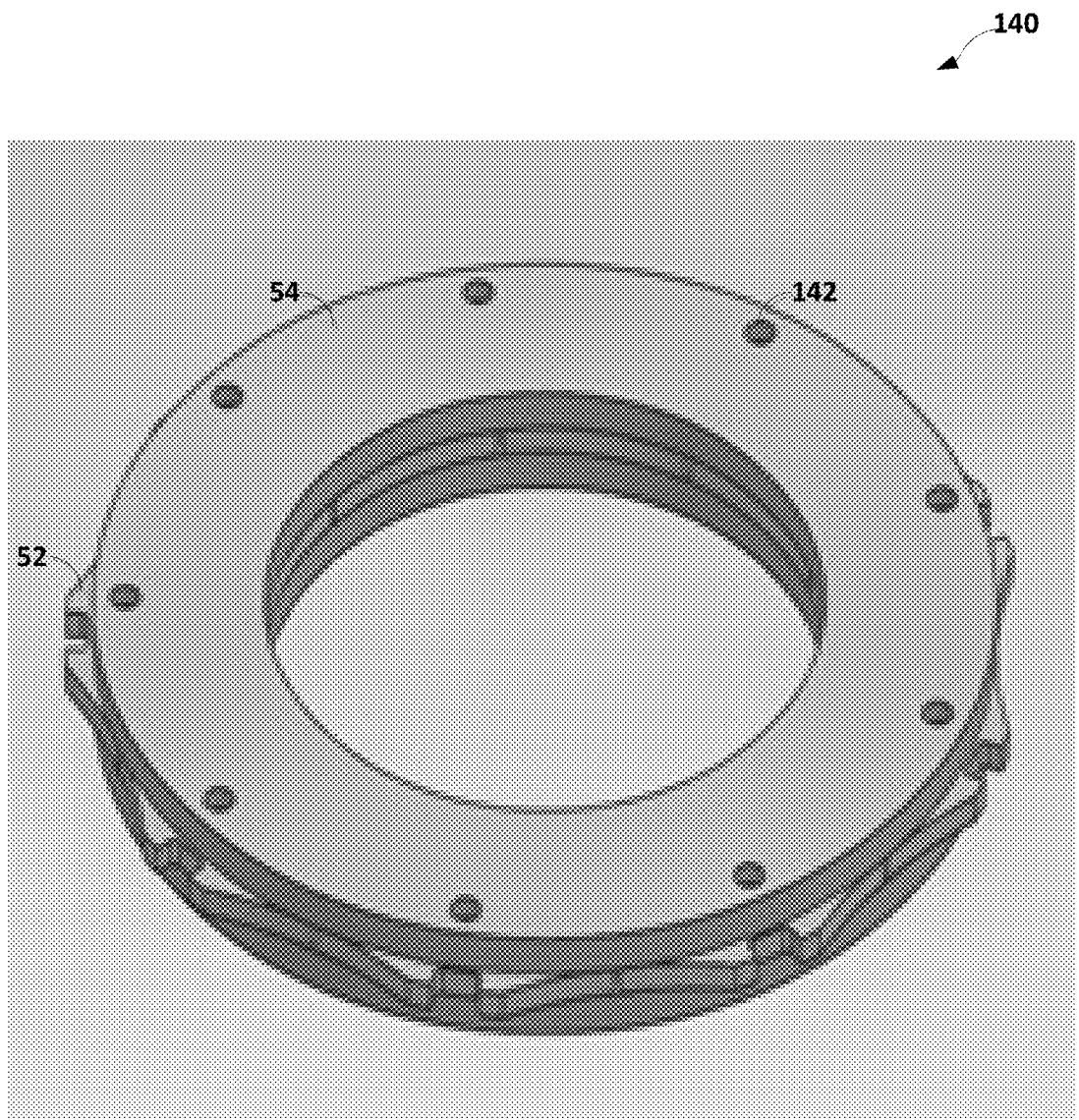
FIG. 8 is a schematic diagram illustrating another example brake disc assembly.

In the example of FIGS. 3A-3B, boss assemblies 72 may prevent pads 54 from rotating relative to core portion 52 during braking operation (e.g., when a force is applied into the friction surfaces of the pads 54). In some examples, additional attachment features may be included in assembly 70 to attach pads 54 to core 52, e.g., when a braking force is not being applied. For example, rivets or other mechanical fasteners may be employed to attach pads 54 to core portion 52. FIG. 8 is a schematic diagram illustrating an example of a brake disc assembly 140, which is similar to assembly 70.

Brake assembly includes through a plurality of through holes 142 that extend through pads 54 and core portion 52. A rivet or other mechanical fastener may extend through each of the through holes 142 to attach (e.g., clamp) the pads 54 to core portion 52.

Figure 9A:
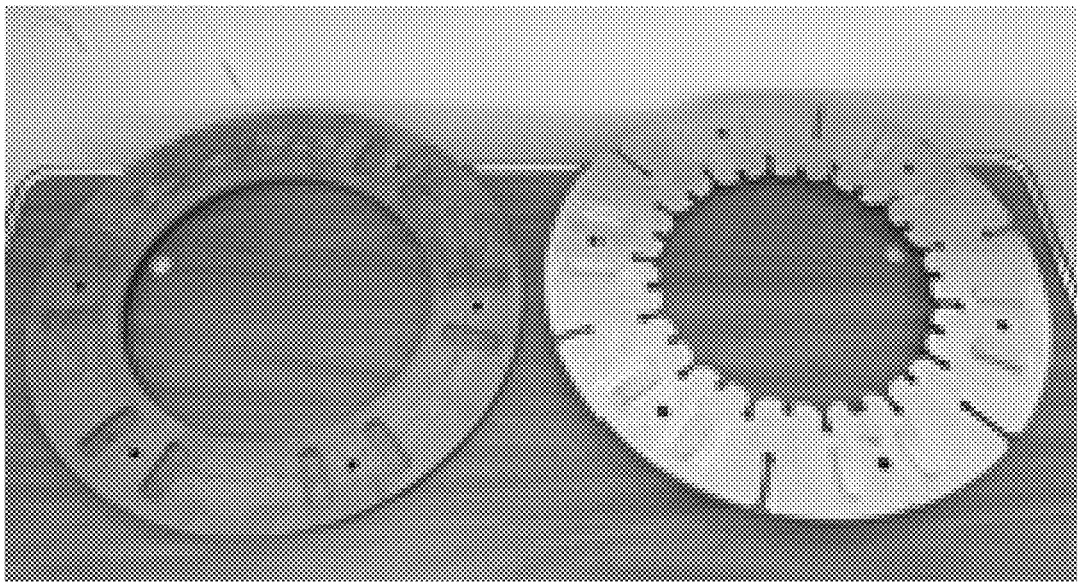
FIGS. 9A-9C are photographs of an example brake disc assembly.
Figure 9B:
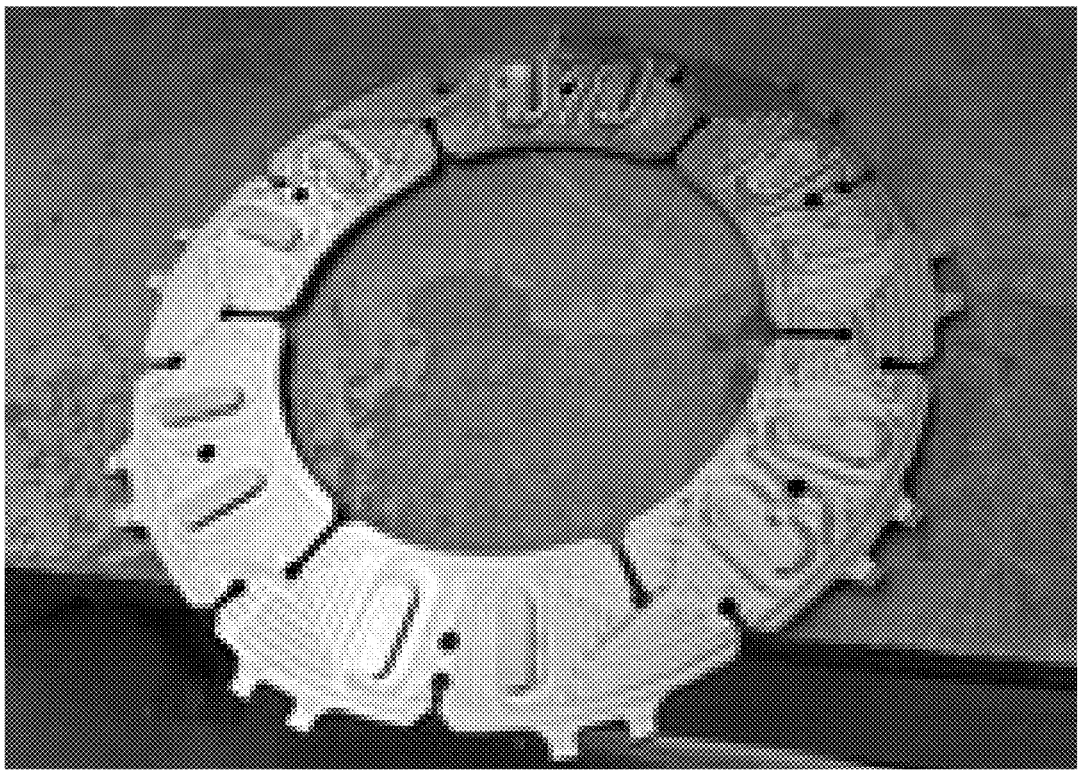
Figure 9C:
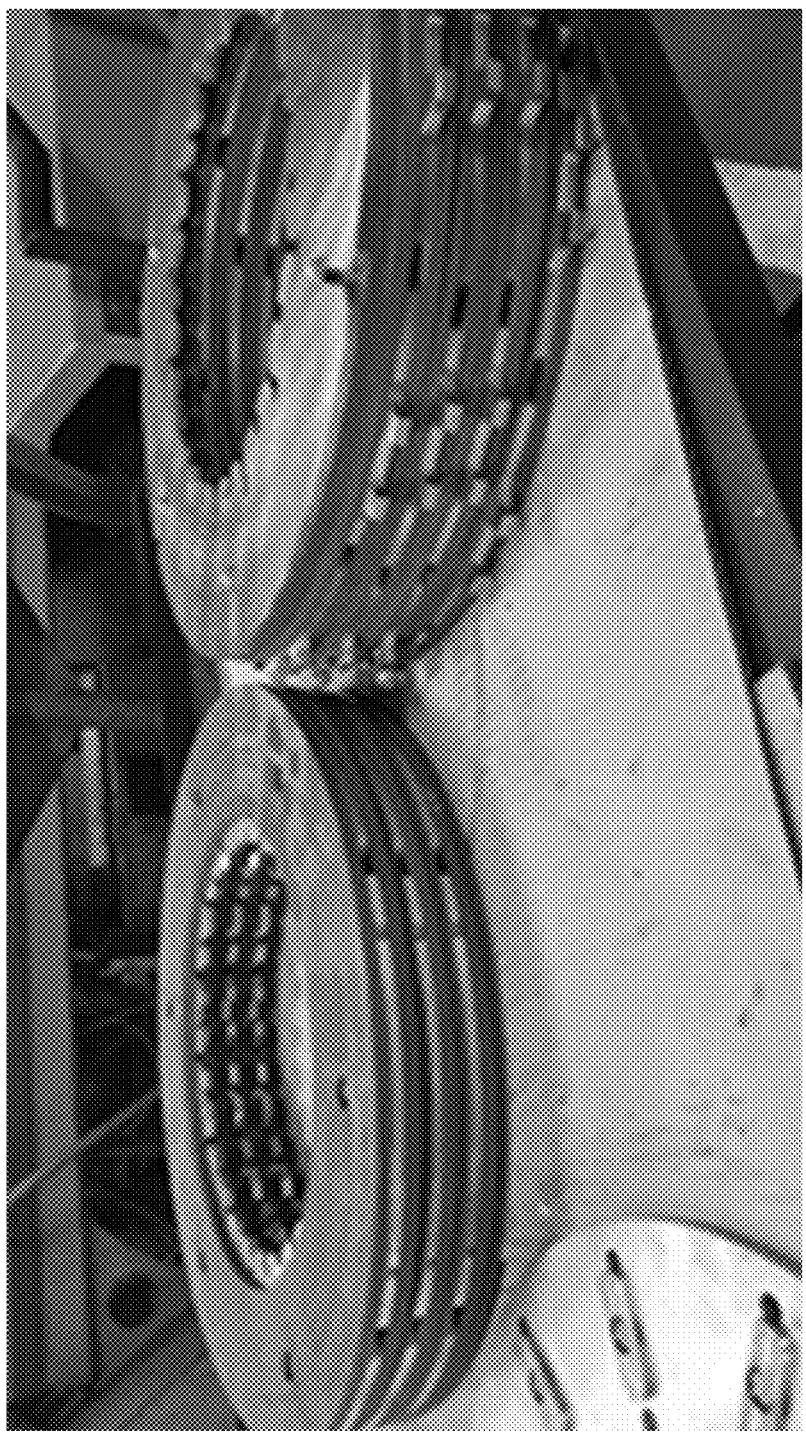

FIG. 9A is a photograph illustrating an example friction pad (left) and a stator core portion (right) having such through holes. FIG. 9B is a photograph illustrating an example rotor core portion having similar through holes. FIG. 9C is a photograph of two brake disc assemblies including stacks of pads and core portions attached to each other with rivets passed through the through holes in each of the friction pads and core portions. The stack, for example, may be used as brake stack 16 of wheel and brake assembly 10 of FIG. 1.

Figure 4A:
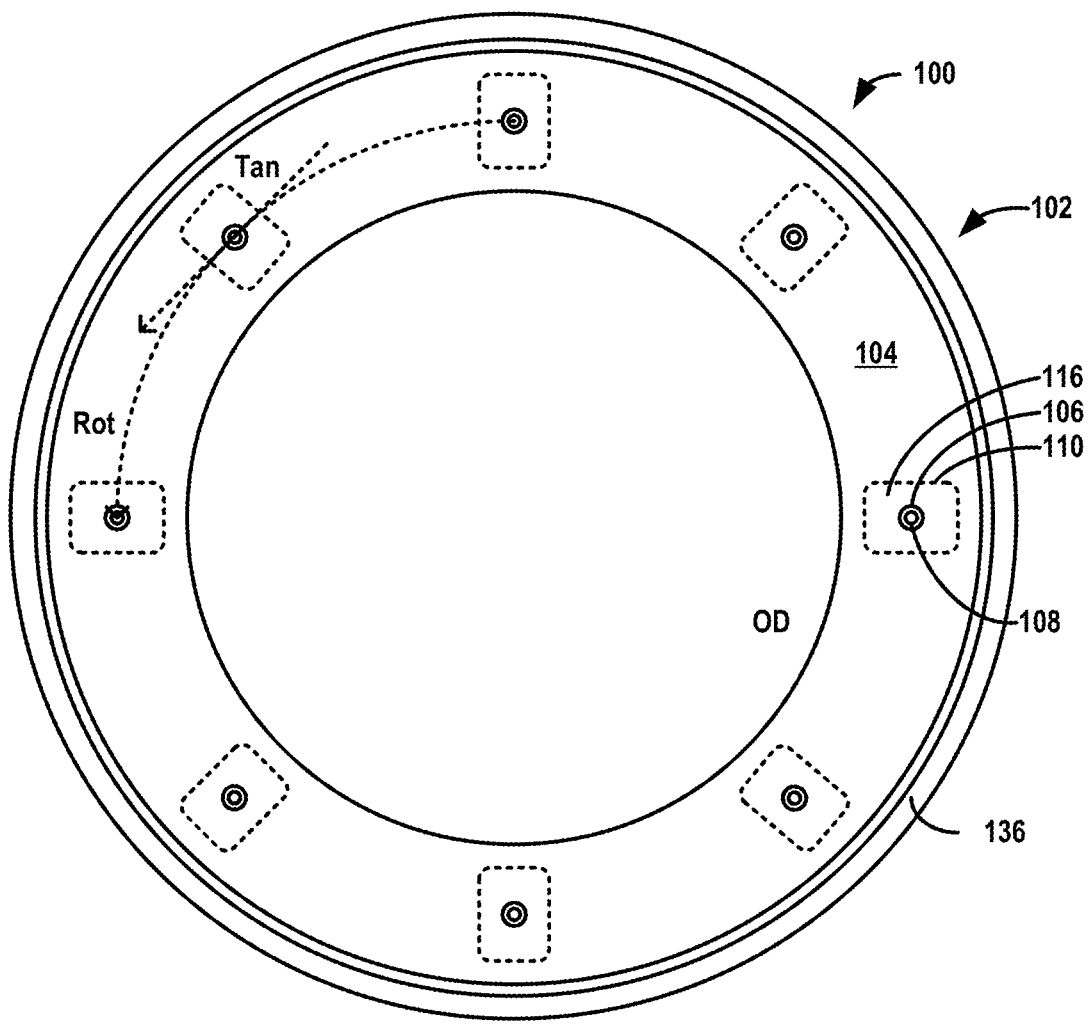
FIG. 4A is a schematic front view diagram of an example brake disc assembly, according to examples of the disclosure.
Figure 4B:
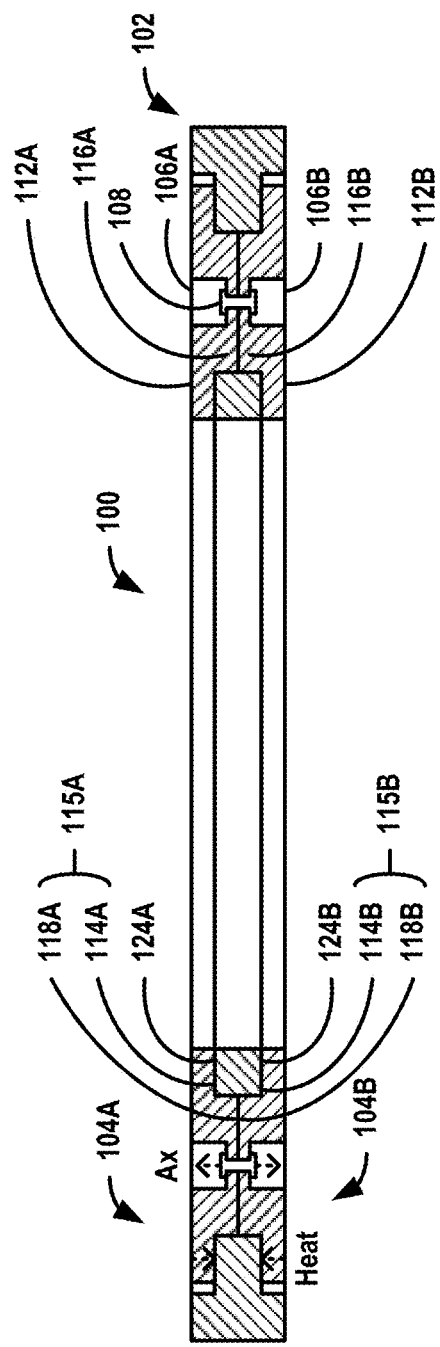
FIG. 4B is a schematic cross-sectional side view diagram of an example brake disc assembly, according to examples of the disclosure.

FIG. 4A is a schematic front view diagram of another example brake disc assembly 100, while FIG. 4B is a schematic cross-sectional side view diagram of example brake disc assembly 100 of FIG. 4A, according to examples of the disclosure. Brake disc assembly 100 includes a core portion 102 and a plurality of friction pads on one or more sides of single continuous core portion 102. In the example of FIGS. 4A and 4B, the plurality of friction pads includes a first friction pad 104A and a second friction pad 104B (referred to singularly and collectively as "friction pad 104" and "friction pads 104"). The rectangular dashed lines in FIG. 4A may represent pockets 110 which transfer the torque from the friction pad to the structural core. The friction pads can either be one continuous friction pad or a plurality of frictions pads, e.g., which may be arranged in the shape shown in FIG. 4A.

Brake disc assembly 100 may be an example of brake disc assembly 50 described with regard to FIGS. 2A and 2B. Friction pads 104 may be formed of a material substantially the same as that described for friction pads 54. Core portion 102 may be formed of a material substantially the same as that described for core portion 52. For example, friction pads 54 may be formed of a carbon-carbon composite material and core portion 102 may be formed of a material other than that of a carbon-carbon composite material.

Brake disc assembly 100 may be used for any one or more of rotor brake discs 36 and/or stator brake discs 38. Brake disc assembly 100 may be used, for example, as rotor brake discs 36 or stator brake discs 38 of FIG. 1. Core portion 102 may be a disc or annulus having a first core surface 124A and a second core surface 124B (referred to singularly and collectively as "core surface 124" and "core surfaces 124") that are oppositely oriented from each other and configured to receive and interface with corresponding friction pads 104A and 104B. Correspondingly, each friction pad 104 may be a disc or annulus having a corresponding pad surface 115A and 115B (referred to singularly and collectively as "pad surface 115" and "pad surfaces 115") and a corresponding friction surface 112A and 112B (referred to singularly and collectively as "friction surface 112" and "friction surfaces 112") that are oppositely oriented from each other. Each pad surface 115 of friction pad 104 is configured to be received by core portion 102 and interface with a core surface 124 on a same side of core portion 102 and a support structure, such as another friction pad 104, on an opposite side of core portion 102.

First and second core surfaces 124 of core portion 102 may include one or more structural features configured to pair and interface with one or more friction pads 104. Correspondingly, first and second pad surfaces 115 of friction pads 104 may include one or more structural features configured to pair and interface with the one or more structural features of core portion 102. The structural features of core portion 102 and friction pads 104 may provide improved load distributions, better friction pad retention, reduced costs associated with manufacturing and assembly, as well as other benefits described in further detail below. The structural features of core portion 102 may include, for example, one or more of geometrically complementing pockets 110 (shown as dashed lines) and corresponding bosses 116 for pairing and distributing torque load forces between core portion 102 and a respective friction pad 104.

First and second core surfaces 124 of core portion 102 may also include a high percentage of surface area configured to thermally contact pad surfaces 115 of friction pads 104. First and second core surfaces 124 may thermally contact friction pads 104 by being close enough in proximity to friction pads 104 that friction pads 104 transfer heat to first and second core surfaces 124, such as through direct contact or contact through an intermediate layer or volume. Correspondingly, first and second pad surfaces 115 of friction pads 104 may include a high percentage of surface area configured to thermally contact core portion 102. The high percentage of surface area of core portion 102 and friction pads 104 that are in thermal contact may provide improved removal and dissipation of heat (e.g., higher heat removal rate, lower temperature, and/or more even temperature distribution) from friction pads 104 to core portion 102. The proportion of surface area of friction pads 104 thermally contacting core portion 102 may be, for example, greater than 50% of a total surface area of a pad surface 115 of a respective friction pad 104 facing core portion 102, such as greater than 70% of the total surface area of the pad surface 115, or greater than 90% of the total surface area of pad surface 115.

Friction pads 104 may include one or more securing features configured to secure opposing friction pads 104 to each other. The securing features of friction pads 104 may provide for improved ease of installation and manufacturing. The securing features of friction pads 104 may include, for example, one or more bores 106 for extending and securing a fastener 108 between friction pads 104.

Core portion 102 includes first core surface 124A on a first side and second core surface 124B on a second side. Core portion 102 also includes a plurality of pockets 110 extending between first core surface 124A and second core surface 124B. First friction pad 104A includes a first friction surface 112A, a first planar pad surface 114A, and a first plurality of bosses 116A extending from first planar pad surface 114A. Second friction pad 104B includes a second friction surface 112B, a second planar pad surface 114B, and a second plurality of bosses 116B extending axially outward (e.g., along an intended axis of rotation of core portion 102) from second planar pad surface 114B. Each of the first plurality of bosses 116A includes a first bore 106A and each of the second plurality of bosses 116B includes a second bore 106B.

As illustrated in FIG. 4B, when brake disc assembly 100 is assembled, first planar pad surface 114A contacts first core surface 124A and second planar pad surface 114B contacts second core surface 124B. First plurality of bosses 116A and second plurality of bosses 116B engage with the plurality of pockets 110 of core portion 102 to position the respective first friction pad 104A and second friction pad 104B relative to core portion 102. An elongated fastener of a plurality of elongated fasteners 108 passes through first bore 106A of a corresponding one of the first plurality of bosses 116A and the second bore 106B of a corresponding one of the second plurality of bosses 116B to fasten first friction pad 104A and second friction pad 104B to core portion 102.

During braking, torque applied against friction pads 104 and heat generated by friction pads 104 may be transferred to core portion 102. For example, first and second friction surfaces 112A and 112B (referred to singularly and collectively as "friction surface 112" and "friction surfaces 112") may receive torque from adjacent friction surfaces and transfer at least a portion of the torque to core portion 102 through the first and second plurality of bosses 116A and 116B (referred to singularly and collectively as "plurality of bosses 116" and "pluralities of bosses 116") of friction pads 104 to the plurality of pockets 110 of core portion 102. Friction surfaces 112 may also generate heat during braking and dissipate at least a portion of the heat to core portion 102 from core surfaces 124 of core portion 102 to first and second planar pad surfaces 114A and 114B (referred to singularly and collectively as "planar pad surface 114" and "planar pad surfaces 114") of friction pads 104. Fastener 108 securing friction pad 104A and friction pad 104B may receive a tensile force and transfer the tensile force to an opposite one friction pads 104 and, correspondingly, an opposite core surface of core portion 102. In this way, torque and heat produced during braking may be transferred from friction pads 104 to core portion 102, such that friction pads 104 may operate under lower stresses and/or at lower or more even temperatures than disc brake assemblies that do not include structural and surface properties of disc brake assembly 100.

Figure 4C:
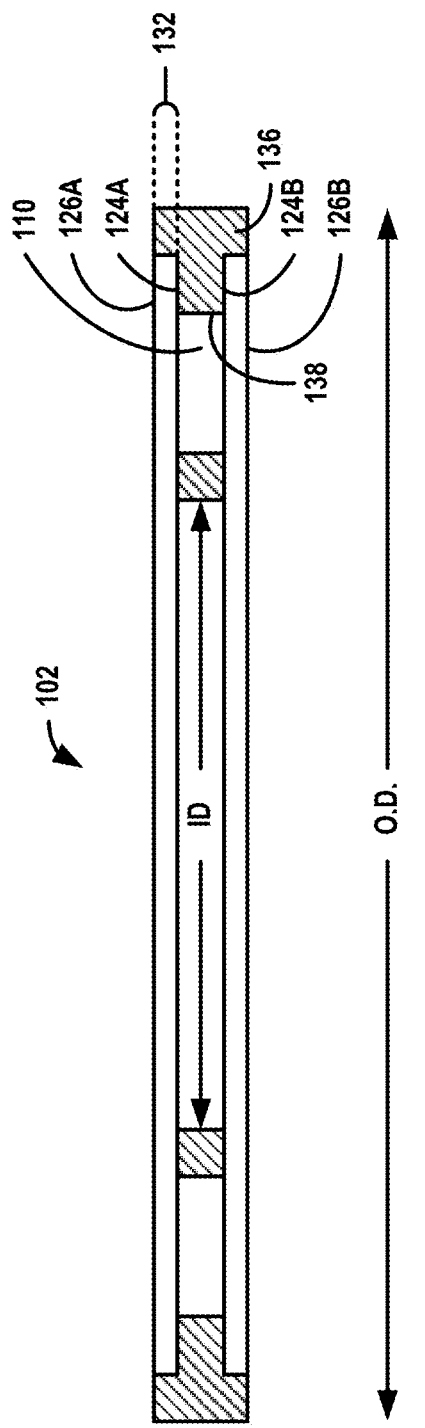
FIG. 4C is a schematic cross-sectional side view diagram of an example core portion, according to examples of the disclosure.

FIG. 4C is a schematic cross-sectional side view diagram of example core portion 102, according to examples of the disclosure. Core portion 102 includes first core surface 124A, second core surface 124B, and the plurality of pockets 110 extending between first core surface 124A and second core surface 124B. Core portion 102 is configured to position friction pad 104 relative to core portion 102 using the plurality of pockets 110. Each pocket of the plurality of pockets 110 is configured to engage with a boss of the plurality of bosses 116 of at least one friction pad 104 to position the respective friction pad 104 relative to core portion 102. During attachment of friction pad 104 to core portion 102, the plurality of pockets 110 may receive a plurality of bosses 116 of at least one friction pad 104, such that friction pad 104 may be quickly and/or easily positioned relative to core portion 102.

Core portion 102 is configured to receive a braking force or torque from at least one friction pad 104 through the plurality of pockets 110. Each pocket of the plurality of pockets 110 is configured to receive a boss of the plurality of bosses 116 of at least one friction pad 104 and includes a pocket wall 138 intersecting a plane of each core surface 124. During braking, at least a portion of pocket wall 138 may receive a portion of the braking force from the boss of the corresponding friction pad 104. As such, the braking force may be distributed over the plurality of pockets 110. In some examples, each pocket of the plurality of pockets 110 may be configured to receive a first boss (e.g., first boss 116A) from a first friction pad (e.g., first friction pad 104A) and a second boss (e.g., second boss 116B) from a second friction pad (e.g., second friction pad 104B), such that a surface of the first boss and a surface of the second boss may contact.

In addition to supporting friction pad 104, core portion 102 is configured to receive thermal energy from at least one friction pad 104 through at least one of core surfaces 124. Each core surface 124 may be configured to contact planar pad surface 114 of at least one friction pad 104. Contact between planar pad surface 114 of the respective friction pad 104 and the respective core surface 124 may provide for conductive heat transfer of heat generated by friction pad 104 to the respective core surface 124. In some examples, each core surface 124 may be configured so that at least 50% of a pad surface of a respective friction pad or combination of friction pads may contact the respective core surface 124. For example, each core surface 124 may have a shape and/or size such that substantially all of a pad surface of the respective friction pad that is not positioned in the plurality of pockets 110 may be contacting a respective core surface 124. In this way, heat may be more quickly and/or evenly removed from friction pad 104, such that friction pad 104 may have a lower and/or more even temperature than a friction pad that does not have a high surface area contacting a structural member.

In some examples, core portion 102 includes rim 136 on an outer edge of core portion 102. Rim 136 defines a first rim surface 126A extending axially beyond first core surface 124A and a second rim surface 126B extending axially beyond second core surface 124B. While not shown, rim 136 may include drive regions for coupling to beam keys. For example, rather than couple friction pads 104 to beam keys, core portion 102 may interface with beam keys through the drive regions, such that friction pads 104 may be less complex to manufacture. Additionally or alternatively, rim 136 may be configured to increase a drive region contacting beam keys, which may distribute load more effectively to the beam keys. In some example, rim 136 may be configured such that a gap exists between an outer edge of the respective friction pad and an inner radial surface of rim 136. This gap may reduce vibration as the friction pads wear down by reducing friction surface of a rotor and stator from contacting on an outer diameter/inner diameter interface.

Core portion 102 may be a disc or annulus that defines an inner diameter (I.D.) and outer diameter (O.D.) having first core surface 124A and second core surface 124B oppositely oriented from each other and configured to receive friction pads 104. Core portion 102 may have a variety of dimensions (e.g., outer diameter, inner diameter, thickness, etc.), which may depend on its use (e.g., braking loads). A thickness of core portion 102 may depend on strength and thermal aspects of a design of core portion 102, as well as material properties of core portion 102. In some examples, core portion 102 may have a thickness between first core surface 124A and second core surface 124B that is between about 0.125 inches and about 2 inches.

In some examples, the dimensions of core portion 102 may be selected to provide for improved thermal contact with friction pads 104. For example, as a contact area between a surface of core portion 102 and friction pad 104 increases, an amount of thermal energy that may be transferred from friction pad 104 to core portion 102 increases for a given temperature gradient between core portion 102 and friction pad 104. In some examples, core portion 102 may have an inner diameter and outer diameter such that substantially all (e.g., greater than 95%) of planar pad surface 114 of friction pad 104 may be in contact with one of core surface 124A or core surface 124B when friction pad 104 is received on the respective core surface 124.

In some examples, the plurality of pockets 110, and correspondingly, the plurality of bosses 116, may be configured such that a structural integrity of core portion 102 and friction pads 104 may be improved. For example, the plurality of bosses 116 and the plurality of pockets 110 may be sized to have an area parallel to friction surfaces 112 to overcome shear loading stresses exerted on the plurality of bosses. As another example, the plurality of bosses 116 and the plurality of pockets may be sized so that a shear load on core portion 102 may not exceed an integrity threshold. As such, a size of the plurality of pockets 110 and the plurality of bosses 116 may be balanced between a structural integrity of core portion 102 and a structural integrity of friction pads 104. As another example, the plurality of pockets 110 and the plurality of bosses 116 may have a thickness sufficient to overcome bearing load stresses.

The plurality of pockets 110 may be configured with a size, orientation, and distribution based on a variety of factors including, but not limited to, surface area for each pocket, surface area of the plurality of pockets, ratio of tangential surface area (e.g., a surface area of each pocket in a direction tangent to a direction of rotation of core portion 102) to axial surface area, and the like. In some examples, the size, shape, and location of the plurality of pockets 110 may be standardized, such that a variety of friction pads 104 having different properties may be used with core portion 102. For example, a service life of core portion 102 may be significantly longer than a service life of friction pads 104, such that friction pads 104 may be replaced and, in some instances, updated with other friction pads 104. As another example, a common friction pad 104 may be used with a variety of core portions 102. For instance, a core portion for a rotor with drive regions on an outer diameter may be slightly different from a core portion for a stator with drive regions on an inner diameter, but both rotor and stator may use a same friction pad. Such cross-compatibility may reduce the number of designs of friction pads 104 for forming a brake.

The plurality of pockets 110 may have a variety of sizes and dimensions. In some examples, each pocket of the plurality of pockets has a circumferential dimension (e.g., measured from a center of each pocket along a rotational arc parallel to a direction of rotation of core portion 102) that is between about 0.25 inches, such as for a high number of pockets 110 and/or friction pads 104, and about 12 inches, such as for a low number of pockets 110 and/or friction pads 104. In some examples, each pocket of the plurality of pockets has a radial dimension (e.g., measured from a center of each pocket along a radial direction from a center of core portion 102) that is between about 0.25 inches and about 8 inches. The plurality of pockets 110 may have a variety of quantities. In some examples, a number of the plurality of pockets 110 is between 3, such as for designs having a low number of friction pads 104 each having a high surface area, and 36, such as for designs having a high number of friction pads 104 each having a low surface area.

The plurality of pockets 110 may have a variety of shapes in a radial plane including, but not limited to, rectangles, rounded rectangles, circles, wedges, and the like. In some examples, the plurality of pockets 110 may have a shape and orientation with a high tangential surface area. For example, as illustrated in FIG. 4A, a braking force may be exerted substantially tangent to core portion 102, parallel to a major surface of core portion (e.g., core surface 124A or core surface 124B). As such, pockets that are shaped and oriented such that pocket wall 138 has high surface area facing the direction of braking force may distribute a received force over a greater surface area.

The plurality of pockets 110 may have a variety of configurations and patterns. In some examples, a number and/or tangential surface area that corresponds to an amount of force received from a radial distance from a center of core portion 102. In some examples, the plurality of pockets 110 may be symmetrical in at least one plane. In some examples, each of the plurality of pockets 110 may be located a same radial distance from a center of core portion 102, such that each pocket of the plurality of pockets 110 may receive subsequently a same torque. In some examples, the plurality of pockets 110 may be located at different radial distances from the center of core portion 102.

Core portion 102 may be manufactured from a variety of materials including, but not limited to, metals, such as aluminum, stainless steel, and titanium alloys; and the like. In some examples, core portion 102 may be fabricated from one or more materials capable of being refurbished, such that a service life of core portion 102 may be substantially longer than friction pad 104.

In some examples, core portion 102 may be manufactured from a material having a high strength, particularly in the circumferential direction. For example, as discussed above, core portion 102 may be configured to receive a braking force from friction pads 104. As such, core portion 102 may be manufactured from materials that have a high strength to withstand various forces on core portion due to the received braking force. In some examples, core portion 102 has a high strength (tensile, compressive, and/or shear) at elevated temperatures experienced during braking.

In some examples, core portion 102 may be manufactured from a material having an ability to receive and/or store large amounts of heat. For example, as discussed above, core portion 102 may be configured to receive heat from friction pads 104. As such, core portion 102 may be manufactured from materials that have a high specific heat capacity to receive large amounts of heat, and/or other thermal properties such as high thermal effusivity or high thermal diffusivity. In some examples, core portion 102 includes a material having a specific heat capacity greater than 200 J/kg·K at room temperature, such as greater than 475 J/kg·K. For example, tungsten carbide may have a specific heat of greater than 200 J/kg·K, steel may have a specific heat capacity greater than 475 J/kg·K, and boron-nitride may have a specific heat capacity greater than 1500 J/kg·K. In some examples, core portion 102 includes a material having a thermal conductivity greater than 7 W/m·K at room temperature, such as greater than 20 W/m·K. For example, titanium alloys may have a thermal conductivity greater than 7 W/m·K. In some examples, structure core 102 includes a material having a thermal conductivity greater than carbon (~23 W/m·K).

In some examples, core portion 102 may be manufactured through relatively simple manufacturing processes, such as cutting (e.g., milling, drilling) and casting (e.g., die casting) processes. For example, structural features of core portion 102, such as the plurality of pockets 110 and rim 136, may involve relatively simple geometries (e.g., generally square angles between core surfaces 124 and pocket wall 138) that are relatively simple to fabricate. As such, standard machining and manufacturing processes that are suitable for these simple geometries may be used to more quickly and/or inexpensively manufacture core portion 102. Additionally, or alternatively, such simple geometries may allow for easier refurbishing or repair of core portion 102, such that a service life of core portion 102 may be more easily and/or inexpensively extended.

Figure 4D:
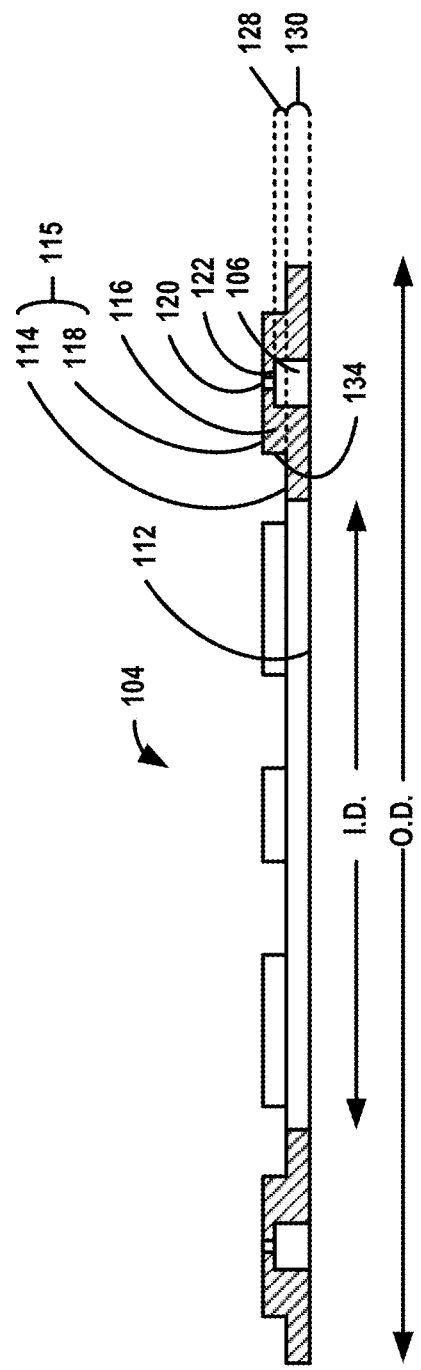
FIG. 4D is a schematic cross-sectional side view diagram of an example friction pad, according to examples of the disclosure.

FIG. 4D is a schematic cross-sectional side view diagram of example friction pad 104, according to examples of the disclosure. Friction pad 104 includes a pad surface 115 and a friction surface 112 opposite the pad surface 115. Pad surface 115 includes planar pad surface 114 and a boss surface 118 for each boss of the plurality of bosses 116 extending from planar pad surface 114. Planar pad surface 114 is configured to contact and thermally interface with one of core surfaces 124.

Each boss of the plurality of bosses 116 is configured to engage with a pocket of the plurality of pockets 110 of core portion 102 to position the respective friction pad 104 relative to core portion 102. For example, each boss of the plurality of bosses 116 may have a size or shape that complements a pocket of the plurality of pockets 110. During attachment of friction pad 104 to core portion 102, the plurality of bosses 116 may fit into a plurality of pockets 110 of core portion 102, such that friction pad 104 may be quickly and/or easily positioned relative to core portion 102.

Friction pad 104 is configured to transfer a braking force or torque to core portion 102 through the plurality of bosses 116. Each boss of the plurality of bosses 116 is configured to be received by a pocket of the plurality of pockets 110 of core portion 102 and includes a boss wall 134 intersecting a plane of planar pad surface 114. During braking, at least a portion of boss wall 134 is configured to contact at least a portion of a corresponding pocket wall 138 when the plurality of bosses 116 is engaged with the plurality of pockets 110, such that at least a portion of boss wall 134 may transfer a portion of the braking force to the pocket of core portion 102. In this way, a braking force may be applied through a surface area of boss wall 134 of the plurality of bosses 116 to core portion 102.

In addition to transferring the braking force, friction pad 104 is configured to convert kinetic energy to thermal energy and transfer at least a portion of the thermal energy to core portion 102 through pad surface 114. Planar pad surface 114 is configured to contact core surface 124 of core portion 102. Contact between core surface 124 and planar pad surface 114 may provide for conductive heat transfer of heat generated by friction surface 112 of friction pad 104 to the respective core surface 124. In some examples, thermal contact between core portion 102 and friction pad 104 may be expressed as a portion (e.g., percentage) of total surface area of friction pad 104 that is configured to contact core portion 102 (e.g., planar pad surface 114). Planar pad surface 114 includes at least about 50% of a surface area of pad surface 115. In some examples, planar pad surface 114 includes at least about 70% of a surface area of pad surface 115, such as at least about 95%.

Friction pad 104 is configured to secure to core portion 102 using a fastener, such fastener 108. Each of the plurality of bosses 116 includes a bore 106. Bore 106 is configured to receive fastener 108 and pass-through fastener 108 to a structure on an opposing side of core portion 102, such as another friction pad 104 in a two-sided disc brake in a middle of brake disk stack 16 or a support structure in a one-sided disc brake at an end of brake disk stack 16.

In some examples, friction pad 104 may be configured to have an increased usable depth of friction surface 112 over a life of friction pad 104 by recessing bore 106. For example, the depth of friction surface 112 may be limited by a closer (e.g. nearer to friction surface 112) of core surface 124 of core portion 102 or fastener 108 in bore 106, such that by recessing bore 106, fastener 108 may not limit a depth of friction surface 112. In some examples, an inner bore surface 122 of each bore 106 extends a recess distance 128 beyond a plane of planar pad surface 114. In some examples, recess distance 128 is greater than a head height of fastener 108, such as greater than about 0.1 inches. During use, friction surface 112 of friction pad 104 may not wear down to fastener 108, such that friction pad 104 may remain secured to core portion 102. In some examples, a thickness 132 of rim 136 between rim surface 126 and planar core surface 124 is about a thickness 130 of friction pad 104 between friction surface 112 and planar pad surface 114, in which thickness 130 represents a usable depth of friction surface 112 over the life of friction pad 104.

Friction pad 104 may be in the shape of a disc or annulus defining an outer preform diameter (O.D.) and inner preform diameter (I.D.). In some examples, the outer diameter (O.D.) of friction pad 104 may be about 12 inches (e.g., about 37 cm) to about 25 inches (e.g., about 64 cm) and the inner preform diameter (I.D.) of friction pad 104 may be about 4.5 inches (e.g., about 12 cm) to about 15 inches (e.g., about 38 cm).

The plurality of bosses 116 may be configured with a size, orientation, and distribution based on a variety of factors including, but not limited to, thermal expansion of the boss and/or pocket, bearing area of the boss and/or pocket, shear area of the boss and/or pocket, surface area for each pocket, surface area of the plurality of pockets, ratio of tangential surface area (e.g., a surface area of each boss in a direction tangent to a direction of rotation of friction pad 104) to axial surface area, and the like. The plurality of bosses 116 may have a size, orientation, or distribution that complements the plurality of pockets 110.

The plurality of bosses 116 may have a variety of sizes and dimensions. In some examples, each boss of the plurality of bosses 116 has a circumferential dimension (e.g., measured from a center of each boss along a rotational arc parallel to a direction of rotation of frictional pad 104) that is between about 0.25 inches and about 12 inches. In some examples, each boss of the plurality of bosses 116 has a radial dimension (e.g., measured from a center of each pocket along a radial direction from a center of friction pad 104) that is between about 0.25 inches and about 8 inches.

The plurality of bosses 116 may have a variety of shapes including, but not limited to, rectangles, rounded rectangles, circles, wedges, and the like, corresponding to a shape of the plurality of pockets 110 of core portion 102. In some examples, the plurality of bosses 116 may have a shape and orientation with a high tangential surface area. For example, as illustrated in FIG. 4A, a braking force may be exerted substantially tangent to core portion 102. As such, bosses that are shaped and oriented such that boss wall 134 has high surface area facing the direction of braking force may transfer a force over a greater surface area. In some examples, each boss surface 118 is configured to contact a corresponding boss surface 118 of another boss of a second plurality of bosses of another friction pad when the plurality of bosses 116 and the second plurality of bosses are engaged with the plurality of pockets 110. As such, the plurality of bosses of two opposing friction pads may extend through a corresponding pocket 110 and contact substantially a full interior surface of the corresponding pocket 110.

The plurality of bosses 116 may have a variety of configurations and patterns. In some examples, a number and/or tangential surface area that corresponds to an amount of force received from a radial distance from a center of friction pad 104. In some examples, the plurality of pockets 116 may be symmetrical in at least one plane. In some examples, the plurality of pockets 116 may have a same radial distance from a center of friction pad 104, such that each boss of the plurality of bosses 116 may transfer substantially a same torque. In some examples, the plurality of bosses 116 may have different radial distances from the center of friction pad 104.

In some examples, friction pads 104 may be cross-compatible with both rotor and stator brake discs. For example, rotors, stators, and end plates may use a same friction pad 104 attached to different style core portions 102. As long as the plurality of pockets 110 of each core portion 102 for stators, rotors, or end plates correspond to the plurality of bosses 116 of friction pads 104, such friction pads may be used with the corresponding core portion 102, despite different designs of other sections of core portion 102. Such cross-compatibility may reduce a number of parts to be manufactured, which may reduce an inventory and allow for cheaper manufacturing.

Friction pads 104 may be manufactured from a carbon-carbon composite material. In some examples, friction pad 104 may be manufactured from a carbon-carbon composite material having a high thermal stability, a high wear resistance, and/or stable friction properties. For example, as discussed above, friction pad 104 is configured to convert kinetic energy to thermal energy. As such, friction pad 104 may be manufactured from carbon-carbon composite materials that have a high thermal stability to withstand high temperatures. In some examples, friction pad 104 includes a material having an operating temperature threshold greater than about 1100° C., such as greater than about 1700° C. For example, carbon may withstand operating temperature greater than about 1725° C.

As described herein, friction pad 104 may be formed from a carbon-carbon composite fabricated from a densified carbon material. In some examples, the carbon material may include a plurality of carbon fibers and densifying material. The carbon fibers may be composed of carbon or carbon precursor materials such as polyacrylonitrile (PAN) or rayon, which may be converted into carbon thorough a carbonization process. The carbon fibers used to form friction pad 104 may be arranged in a woven or non-woven as either a single layer or multilayer structure. In some examples, carbon-carbon composite materials tailored for improved friction aspects may include non-woven carbon fibers and a reinforcement material (e.g., carbonized pitch or resin). The non-woven structure of the carbon fiber matrix may improve the resulting frictional characteristics of friction pad 104 compared to a woven architecture.

Figure 5:
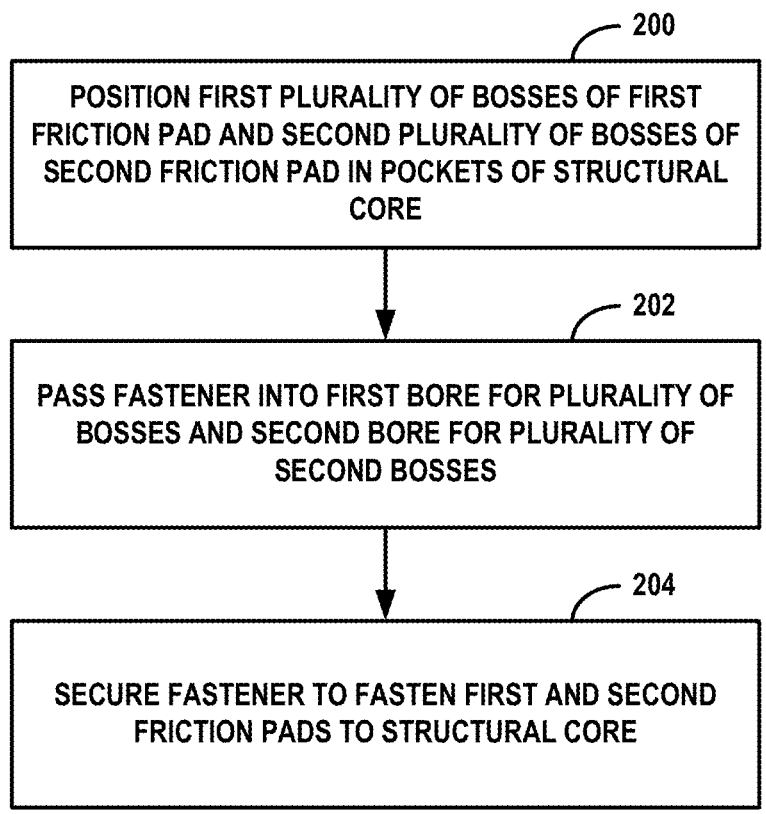
FIG. 5 is a flow diagram illustrating an example technique of assembling a brake disc assembly, according to examples of the disclosure.

FIG. 5 is a flow diagram illustrating an example technique of assembling example brake disc assembly 100, according to examples of the disclosure. FIG. 5 will be described with reference to brake disc assembly 100 of FIGS. 4A-4D. However, it will be understood that the techniques of FIG. 5 may be used to assemble other articles, such as brake disc assembly 50 or brake disc assembly 70. The technique of FIG. 5 includes positioning the first plurality of bosses 116A of first friction pad 104A into the plurality of pockets 110 of core portion 102 to contact first planar pad surface 114A with first core surface 124A and positioning the second plurality of bosses 116B of second friction pad 104B into the plurality of pockets 110 of core portion 102 to contact second planar pad surface 114B with second core surface 124B. The technique of FIG. 5 further includes passing a plurality of elongated fasteners 108 through a first bore 106A of a respective one of the first plurality of bosses 116A and a second bore 106B of a respective one of the second plurality of bosses 116B. The technique of FIG. 5 further includes securing the plurality of elongated fasteners 108 to fasten first friction pad 104A and second friction pad 104B to core portion 102.

Various examples have been described. These and other examples are within the scope of the following claims.

What is claimed is:

1. A brake disc assembly comprising:
    a single continuous core portion defining a core of the brake disc assembly; and
    a friction portion adjacent the core portion, the friction portion defining a friction surface of the brake disc assembly during a braking operation, wherein the friction portion comprises a carbon-carbon composite material, wherein the core portion comprises a core material that is not a carbon-carbon composite material, and wherein the core portion is configured as a heat sink for the brake disc assembly for heat generated during the braking operation,
    wherein the core portion is coupled to the friction portion via a plurality of boss assemblies, each boss assembly being positioned within a corresponding aperture in the core portion such that protruding portions protrude out of a surface plane of the core portion and the protruding portions mate with a corresponding grooved pocket in an opposing surface of the friction portion.

2. The assembly of claim 1, wherein the core material comprises at least one of a steel, tungsten carbide, boron nitride, boron carbide, silicon nitride, or silicon carbide.

3. The assembly of claim 1, wherein the core material comprises a titanium or titanium alloy.

4. The assembly of claim 1, wherein the core material comprises titanium alloyed with at least one of nickel or aluminum.

5. The assembly of claim 1, wherein the core material has a volumetric specific heat capacity of at least about 1.5 Joules/cubic centimeter*Kelvin.

6. The assembly of claim 1, wherein the core portion has a thermal conductivity that is greater than a thermal conductivity of the friction portion.

7. The assembly of claim 1, wherein the brake disc assembly defines an annular disc, wherein the core portion and the friction portion each extend from an outer diameter to an inner diameter of the annular disc.

8. The assembly of claim 1, wherein the friction portion comprises a first friction portion, further comprising a second friction portion, wherein the core portion is between the first friction portion and the second friction portion, and wherein the first friction portion defines a first outer surface of the assembly and the second friction portion defines a second outer surface of the assembly.

9. The assembly of claim 1, wherein the core portion defines a first volume and the friction portion defines a second volume, wherein the ratio of the first volume to the second volume is at least 0.1.

10. The assembly of claim 1, wherein the brake disc assembly comprises an annular disc pad used in an aircraft braking assembly.

11. The assembly of claim 1, wherein the core portion defines a portion of an outer surface of the brake disc assembly.

12. The assembly of claim 1, wherein the protruding portions of the plurality of boss assemblies are larger than the corresponding apertures in the core portion.

13. A method for forming a brake disc assembly, the method comprising
    positioning a single continuous core portion adjacent to a friction portion with a plurality of boss assemblies between the core portion and the friction portion, each boss assembly being positioned within a corresponding aperture in the single continuous core portion such that protruding portions protrude out of a surface plane of the core portion and the protruding portions mate with a corresponding grooved pocket in an opposing surface of the friction portion, wherein the core portion defines a core of the brake disc assembly, wherein the friction portion defines a friction surface of the brake disc assembly during a braking operation, wherein the friction portion comprises a carbon-carbon composite material, wherein the core portion comprises a core material that is not a carbon-carbon composite material, and wherein the core portion is configured as a heat sink for the brake disc assembly for heat generated during the braking operation.

14. The method of claim 13, wherein the core material comprises at least one of a steel, tungsten carbide, boron nitride, boron carbide, silicon nitride, or silicon carbide.

15. The method of claim 13, wherein the core material comprises a titanium or titanium alloy.

16. The method of claim 13, wherein the core material comprises titanium alloyed with at least one of nickel or aluminum.

17. The method of claim 13, wherein the core material has a volumetric specific heat capacity of at least about 1.5 Joules/cubic centimeter*Kelvin.

18. The method of claim 13, wherein the core portion has a thermal conductivity that is greater than a thermal conductivity of the friction portion.

19. The method of claim 13, wherein the brake disc assembly defines an annular disc, wherein the core portion and the friction portion each extend from an outer diameter to an inner diameter of the annular disc.

20. The method of claim 13, wherein the friction portion comprises a first friction portion, the method further comprising placing a second friction portion adjacent the single continuous core portion on a side opposite the first friction portion, wherein the core portion is between the first friction portion and the second friction portion, and wherein the first friction portion defines a first outer surface of the assembly and the second friction portion defines a second outer surface of the assembly.

* * * * *